(12) United States Patent
Morita et al.

(10) Patent No.: US 10,283,243 B2
(45) Date of Patent: May 7, 2019

(54) OXIDE SUPERCONDUCTING BULK MAGNET

(71) Applicants: NIPPON STEEL & SUMITOMO METAL CORPORATION, Tokyo (JP); National University Corporation Tokyo University of Marine Science and Technology, Tokyo (JP)

(72) Inventors: Mitsuru Morita, Tokyo (JP); Hidekazu Teshima, Tokyo (JP); Motohiro Miki, Tokyo (JP); Mitsuru Izumi, Tokyo (JP)

(73) Assignees: Nippon Steel & Sumitomo Metal Corporation, Tokyo (JP); National University Corporation Tokyo University of Marine Science and Technology, Tokyo (JP)

(*) Notice: Subject to any disclaimer, the term of this patent is extended or adjusted under 35 U.S.C. 154(b) by 36 days.

(21) Appl. No.: 15/526,541

(22) PCT Filed: Nov. 13, 2015

(86) PCT No.: PCT/JP2015/082044
§ 371 (c)(1),
(2) Date: May 12, 2017

(87) PCT Pub. No.: WO2016/076433
PCT Pub. Date: May 19, 2016

(65) Prior Publication Data
US 2017/0316859 A1    Nov. 2, 2017

(30) Foreign Application Priority Data
Nov. 14, 2014  (JP) .................................. 2014-231388
Feb. 6, 2015   (JP) .................................. 2015-022384

(51) Int. Cl.
*H01F 6/00*       (2006.01)
*C01G 1/00*       (2006.01)
(Continued)

(52) U.S. Cl.
CPC .................. *H01F 6/00* (2013.01); *C01G 1/00* (2013.01); *C01G 3/00* (2013.01); *C04B 35/4504* (2013.01);
(Continued)

(58) Field of Classification Search
CPC .................................... H01F 6/00; C01G 1/00
See application file for complete search history.

(56) References Cited

U.S. PATENT DOCUMENTS 6,584,333 B1 *  6/2003  Gauss .................. H01L 39/143
174/125.1
2006/0252650 A1  11/2006  Oka et al.
(Continued)

FOREIGN PATENT DOCUMENTS

JP    7-182934 A    7/1995
JP    9-213523 A    8/1997
(Continued)

OTHER PUBLICATIONS

International Search Report and Written Opinon of the International Searching Authority (Forms PCT/ISA/210 and PCT/ISA/237) for International Application No. PCT/JP2015/082044, dated Jan. 26, 2016.

*Primary Examiner* — Paul A Wartalowicz
(74) *Attorney, Agent, or Firm* — Birch, Stewart, Kolasch & Birch, LLP

(57) ABSTRACT

A superconducting bulk magnet comprising a plurality of superconducting bulk materials combined, in which breakage of superconducting bulk materials is prevented and a strong magnetic field can be generated, that is, a supercon-
(Continued)

ducting bulk magnet comprising a plurality of superconducting bulk materials, each comprising a single-crystal formed $RE_1Ba_2Cu_3O_y$ (RE is one or more elements selected from Y or rare earth elements, where $6.8 \leq y \leq 7.1$) in which $RE_2BaCuO_5$ is dispersed and each provided with a top surface, a bottom surface, and side surfaces, combined together, in which superconducting bulk magnet, bulk material units, each comprising a superconducting bulk material and a bulk material reinforcing member arranged so as to cover a side surface of the same, are arranged facing the same direction and contacting each other to form an assembly, a side surface of the assembly is covered by an assembly side surface reinforcing member, a top surface and bottom surface of the assembly are respectively covered by an assembly top reinforcing member and an assembly bottom reinforcing member, and the assembly side surface reinforcing member, the assembly top reinforcing member, and the assembly bottom reinforcing member are joined into an integral unit, is provided.

14 Claims, 20 Drawing Sheets

(51) Int. Cl.
*C01G 3/00* (2006.01)
*H01F 1/11* (2006.01)
*H01B 12/02* (2006.01)
*C04B 35/45* (2006.01)

(52) U.S. Cl.
CPC ............... *H01B 12/02* (2013.01); *H01F 1/11* (2013.01); *C04B 2235/3224* (2013.01); *Y02E 40/64* (2013.01); *Y02E 40/641* (2013.01)

(56) References Cited

U.S. PATENT DOCUMENTS

| | | |
|---|---|---|
| 2012/0231958 A1 | 9/2012 | Morita et al. |
| 2016/0086707 A1* | 3/2016 | Hahn ........................ H01F 6/06 335/216 |

FOREIGN PATENT DOCUMENTS

| | | |
|---|---|---|
| JP | 11-284238 A | 10/1999 |
| JP | 11-335120 A | 12/1999 |
| JP | 2000-277333 A | 10/2000 |
| JP | 2001-46351 A | 2/2001 |
| JP | 2001-307916 A | 11/2001 |
| JP | 2004-349276 A | 12/2004 |
| JP | 2014-146760 A | 8/2014 |
| WO | WO 2004/097865 A1 | 11/2004 |
| WO | WO 2011/071071 A1 | 6/2011 |

* cited by examiner

<DISTRIBUTION OF MAGNETIC FLUX DENSITY>

<DISTRIBUTION OF MAGNETIC FLUX DENSITY>

OXIDE SUPERCONDUCTING BULK MAGNET

TECHNICAL FIELD

The present invention relates to an oxide superconducting bulk magnet. In particular, it relates to an oxide superconducting bulk magnet having a structure comprising a plurality of oxide superconducting bulk materials which are arranged in parallel.

BACKGROUND ART

An oxide superconducting material comprising a single-crystal formed $REBa_2Cu_3O_{7-x}$ (RE means rare earth element) phase in which a $RE_2BaCuO_5$ phase is dispersed has a high critical current density (below, also indicated as "$J_c$"), so is magnetized by cooling in a magnetic field or by pulse magnetization and can be used as a superconducting bulk magnet able to generate a strong magnetic field.

A superconducting bulk magnet has the excellent feature of being able to generate an extremely powerful magnetic field in a compact space, but since an extremely strong magnetic field is sealed in the compact space, a large electromagnetic stress acts inside an oxide superconducting bulk material. This electromagnetic stress acts so that the sealed-in magnetic field spreads, so is also called "hoop stress". In the case of a 5 to 10T class strong magnetic field, the electromagnetic stress which acts sometimes exceeds the mechanical strength of the material of the superconducting bulk material itself. As a result, the oxide superconducting bulk material is liable to break. If the oxide superconducting bulk material breaks, the superconducting bulk material can no longer generate a strong magnetic field.

If possible to prevent breakage of a superconducting bulk material by electromagnetic stress, the features of a superconducting bulk magnet of compactness and a strong magnetic field can be expected to be made use of for help in improving the performance of the equipment and reducing the size and lightening the weight of equipment in applications utilizing magnets such as marine motors or windpower generators or magnetic separation.

To prevent breakage of an oxide superconducting bulk material by electromagnetic stress, for example, PLT 1 proposes a superconducting bulk magnet configured by circular columnar shaped oxide superconducting bulk material and a metal ring surrounding the same. By configuring the magnet in this way, at the time of cooling, a compressive stress due to the metal ring is applied to the oxide superconducting bulk material. This compressive stress has the effect of reducing the electromagnetic stress, so it is possible to suppress breakage of the oxide superconducting bulk material.

Further, PLT 2 discloses a superconducting bulk magnet reinforcing the entire side surface of the superconducting bulk material by a metal ring etc. and, furthermore, reinforcing the top and bottom surfaces of the superconducting bulk material as well by reinforcing members. By configuring the magnet in this way, it becomes possible to generate a high magnetic field even in the case of a large superconducting bulk material.

In this regard, in general, a single-crystal formed oxide superconducting material is small in size. It is difficult to apply a superconducting bulk material obtained by working this to systems requiring generation of magnetic fields over relatively large areas (for example, large size rotating equipment, large size magnets, etc.). Therefore, it is necessary to assemble a plurality of superconducting bulk materials to form a single assembly of superconducting bulk materials and generate a magnetic field over a relatively large area.

In this regard, the above PLTs 1 and 2 only show that it is possible to prevent breakage of a single circular columnar shaped oxide superconducting bulk material and does not disclose a configuration comprising a plurality of superconducting bulk materials combined.

Regarding a configuration comprising a plurality of superconducting bulk materials combined, for example, FIG. 3 of PLT 3 discloses a superconducting magnetic field generating device which is manufactured by combining seven hexagonal shaped superconducting bulk materials, arranging a reinforcing member comprising a fiber reinforced resin etc. around them, and further arranging a support member comprising stainless steel, aluminum or other metal at outer circumference thereof.

Further, PLT 4 discloses an oxide superconducting bulk magnet comprising a superconducting bulk magnet having a through path and the circumference of the superconducting bulk magnet is covered by a high strength material. In particular, it discloses a superconducting bulk magnet comprising a plurality of bulk high temperature superconducting members having rectangular outer circumferences and inner circumferences which are respectively covered by rectangular high strength materials for supporting the outer circumferences.

Furthermore, PLT 5 discloses a superconducting magnetic device comprising a plurality of high temperature superconducting member cells bonded together by a binder to form a single compact superconducting cell assembly in which insulators or high electrical resistance materials (stainless steel, copper, or nickel) are interposed between adjoining high temperature superconducting cells. In particular, PLT 5 discloses a superconducting magnet device comprising rectangular shaped high temperature oxide superconducting bulk materials having the outer circumferences of which reinforcing members are covered or coated (PLT 5, Specification, paragraph 0009 and FIG. 6).

Further, PLT 6 discloses a superconducting permanent magnetic device having magnetic poles comprising a plurality of superconducting bulk materials arranged in parallel.

CITATION LIST

Patent Literature

PLT 1. Japanese Patent Publication No. 11-335120A
PLT 2. Japanese Patent Publication No. 2014-146760A
PLT 3. Japanese Patent Publication No. 11-284238A
PLT 4. Japanese Patent Publication No. 7-182934A
PLT 5. Japanese Patent Publication No. 2001-307916A
PLT 6. Japanese Patent Publication No. 2004-349276A

SUMMARY OF INVENTION

Technical Problem

However, in the superconducting magnetic field generating device described in PLT 2, the individual oxide superconducting bulk materials are not reinforced. In the tests of the present inventors, in the configuration disclosed in PLT 2, there is an effect of reinforcement of the surroundings of the assembly of the oxide superconducting bulk materials, but the individual oxide superconducting bulk materials are not reinforced, so when applying a strong magnetic field, the oxide superconducting bulk materials break. Further, in PLTs 3 and 4, damage to the individual superconducting bulk magnets can be prevented, but a sufficient total amount of magnetic flux could not be obtained as an assembly of a plurality of bulk high temperature superconducting members.

Therefore, the present invention was made in consideration of the above problem and has as its object to provide a superconducting bulk magnet comprising a plurality of oxide superconducting bulk materials combined together to secure the required magnetic field region, in which oxide superconducting bulk magnet, breakage of the superconducting bulk materials can be prevented even under high magnetic field strength conditions and a sufficient total amount of magnetic flux can be obtained.

Solution to Problem

To solve the problem, the present inventors discovered that by fitting metal reinforcing frames over the individual oxide superconducting bulk materials, then combining a plurality of members, arranging a reinforcing frame at the outer circumference of the side surfaces of the assembly of the combined member, and, furthermore, fastening the top and bottom surfaces of this assembly of the combined member by reinforcing members, it is possible to prevent breakage of the superconducting bulk materials even in a strong magnetic field. The present invention will be summarized below:

(1) An oxide superconducting bulk magnet comprising a plurality of columnar oxide superconducting bulk materials, each of the columnar oxide superconducting bulk materials having a structure of a single-crystal form $RE_1Ba_2Cu_3O_y$, (RE is one or more elements selected from Y or rare earth elements, where $6.8 \leq y \leq 7.1$) in which $RE_2BaCuO_5$ is dispersed and comprising a top surface, a bottom surface, and side surfaces, the columnar oxide superconducting bulk materials being combined together, wherein each of bulk material units comprises the oxide superconducting bulk material and a bulk material reinforcing member arranged so as to cover side surfaces of the oxide superconducting bulk material, the bulk material units being arranged so as to face the same direction and contact each other to form an assembly, wherein side surfaces of the assembly are covered by an assembly side surface reinforcing member, wherein a top surface and bottom surface of the assembly are respectively covered by an assembly top reinforcing member and an assembly bottom reinforcing member, and wherein the assembly side surface reinforcing member, the assembly top reinforcing member, and the assembly bottom reinforcing member are joined into an integral unit.

(2) The oxide superconducting bulk magnet according to (1) wherein the bulk material reinforcing member has a thickness of 5.0 mm or less.

(3) The oxide superconducting bulk magnet according to (1) or (2), wherein a material which the assembly top reinforcing member is composed of is different from a material which the assembly bottom reinforcing member is composed of, wherein a yield strength of the assembly top reinforcing member is stronger than a yield strength of the assembly bottom reinforcing member at 300K, and wherein a thermal conductivity of the assembly bottom reinforcing member is higher than a thermal conductivity of the assembly top reinforcing member.

(4) The oxide superconducting bulk magnet according to any one of (1) to (3), wherein the material which the assembly top reinforcing member is composed of is nonmagnetic and the yield strength of the assembly top reinforcing member at room temperature (300K) is 200 MPa or more, and wherein the thermal conductivity of the material which the assembly bottom reinforcing member is composed of is 50 W/m·K or more.

(5) The oxide superconducting bulk magnet according to any one of (1) to (4), wherein the height of the assembly side surface reinforcing member is equal to the height of the assembly or more than the height of the assembly.

(6) The oxide superconducting bulk magnet according to any one of (1) to (5), wherein the assembly side surface reinforcing member and at least one of the assembly top reinforcing member and the assembly bottom reinforcing member are an integral structure.

(7) The oxide superconducting bulk magnet according to any one of (1) to (6), wherein the assembly side surface reinforcing member, the assembly top reinforcing member, and the assembly bottom reinforcing member are integrally joined by fastening means.

(8) The oxide superconducting bulk magnet according to (7), wherein the bulk material units are arranged so as to face the same direction and contact each other and, wherein the assembly top reinforcing member and the assembly bottom reinforcing member are integrally joined through spaces formed inside the assembly.

(9) The oxide superconducting bulk magnet according to (7) or (8), wherein the oxide superconducting bulk materials are formed with through holes passing through a top surface and a bottom surface, and, wherein the assembly top reinforcing member and the assembly bottom reinforcing member are integrally joined through the through holes.

(10) The oxide superconducting bulk magnet according to any one of (1) to (9), wherein the oxide superconducting bulk material has a shape in a plan view comprising a polygon.

(11) The oxide superconducting bulk magnet according to any one of (1) to (9), wherein the oxide superconducting bulk material has a shape in a plan view comprising a polygonal shape with rounded vertices.

(12) The oxide superconducting bulk magnet according to (10) or (11), wherein the polygonal shape which the oxide superconducting bulk material has is a tetragon, hexagon, or octagon.

(13) The oxide superconducting bulk magnet according to any one of (1) to (9), wherein the oxide superconducting bulk material has a shape in a plan view comprising a circle.

(14) The oxide superconducting bulk magnet according to any one of (1) to (9), wherein the oxide superconducting bulk material has a shape in a plan view comprising a racetrack shape in which a pair of facing parallel straight lines and a pair of facing curves are connected together.

Advantageous Effects of Invention

As explained above, according to the present invention, it is possible to provide a superconducting bulk magnet comprising a plurality of superconducting bulk materials combined together, wherein breakage of the superconducting bulk materials can be prevented and a strong magnetic field can be generated. Further, in one aspect of the present invention, it is possible to provide rotary equipment which has a uniform distribution of magnetic field in the magnetic electrode with respect to the rotational direction and rotates more smoothly.

DESCRIPTION OF EMBODIMENT

Figure 1:
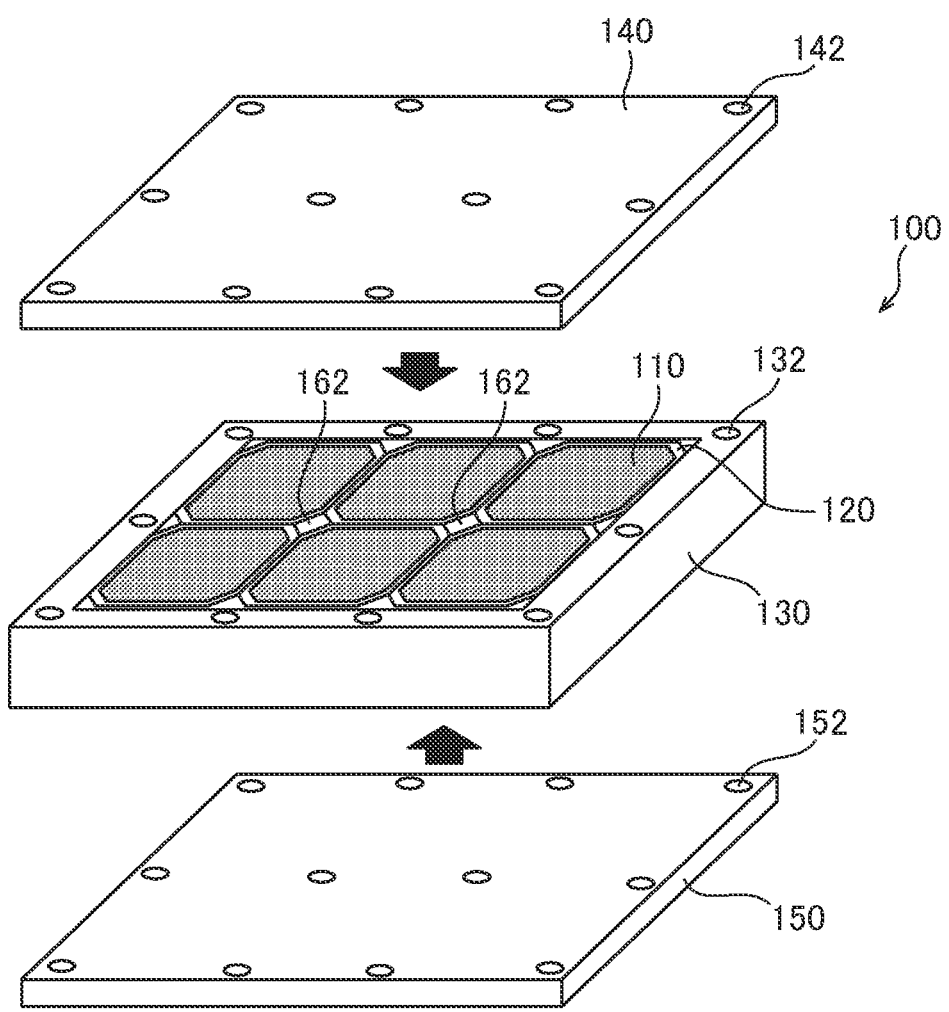
FIG. 1 is a schematic disassembled perspective view showing one example of a superconducting bulk magnet according to the present embodiment.

Below, while referring to the attached drawings, preferred embodiments of the present invention will be explained in detail. Note that, in the Description and Drawings, component elements having substantially the same functions and configurations will be assigned the same reference signs and overlapping explanations will be omitted.

First, an oxide superconducting bulk magnet according to the present embodiment (hereinafter, simply referred to as a "superconducting bulk magnet") will be explained.

The oxide superconducting bulk material used in the oxide superconducting bulk magnet according to the present embodiment (hereinafter, simply referred to as a "superconducting bulk material") is preferably a bulk material (so-called QMG® material) having a structure comprising a single-crystal formed $REBa_2Cu_3O_{7-x}$ in which a nonsuperconducting phase such as an $RE_2BaCuO_5$ phase (211 phase) etc. is finely dispersed. Here, the "single-crystal form" does not have to be a complete single crystal and includes having defects not obstructing practical use such as small angle grain boundaries. The RE in the $REBa_2Cu_3O_{7-x}$ phase (123 phase) and $RE_2BaCuO_5$ phase (211 phase) is a rare earth element comprising Y, La, Nd, Sm, Eu, Gd, Dy, Ho, Er, Tm, Yb, or Lu and combinations of the same. The 123 phase including La, Nd, Sm, Eu, and Gd is outside the 1:2:3 stoichiometric composition. In some cases, Ba is partially substituted at the site of RE. Further, in the nonsuperconducting phase of the 211 phase as well, La and Nd differ somewhat from Y, Sm, Eu, Gd, Dy, Ho, Er, Tm, Yb, and Lu. It is known that the ratio of the metal elements is a nonstoichiometric composition or the crystal structure differs.

Substitution by the above-mentioned Ba element tends to lower the critical temperature. Further, in an environment with a smaller oxygen partial pressure, substitution by the Ba element tends to be suppressed.

The 123 phase is formed by a peritectic reaction between the 211 phase and the liquid phase of the composite oxide of Ba and Cu, that is 211 phase+liquid phase (composite oxide of Ba and Cu)→123 phase.

Further, due to this peritectic reaction, the temperature at which the 123 phase can be formed (Tf: 123 phase generating temperature) is substantially related to the ion radius of the RE element. Along with the decrease of the ion radius, the Tf also falls. Further, Tf tends to fall along with a low oxygen atmosphere and Ag addition.

A material comprising the single-crystal formed 123 phase in which the 211 phase is finely dispersed is formed since when the 123 phase grows as a crystal, the unreacted 211 grains are left in the 123 phase. That is, the above bulk material is formed by a reaction shown by 211 phase+liquid phase (composite oxide of Ba and Cu)→123 phase+211 phase.

Fine dispersion of the 211 phase in the bulk material is extremely important from the viewpoint of improvement of the critical current density $J_c$. By adding a fine amount of at least one of Pt, Rh, or Ce, grain growth of the 211 phase in the semimolten state (state comprising 211 phase and liquid phase) is suppressed and as a result the 211 phase in the material is refined to about 1 μm or so. The amount of addition, from the viewpoint of the amount at which the effect of refinement appears and the cost of the material, is preferably Pt: 0.2 to 2.0 mass %, Rh: 0.01 to 0.5 mass %, and Ce: 0.5 to 2.0 mass %. The added Pt, Rh, and Ce form partial solid solutions in the 123 phase. Further, the elements which are not able to form solid solutions form composite oxides with the Ba or Cu and remain scattered in the material.

Further, each bulk oxide superconducting member forming the magnet has to have a high critical current density ($J_c$) even in a magnetic field. To satisfy this condition, it has to be a single-crystal formed 123 phase not containing high angle grain boundaries which become weak bonds superconductively. To obtain a further higher $J_c$ characteristic, pinning centers for stopping movement of the magnetic flux become necessary. What function as such pinning centers are the finely dispersed 211 phase. Finer dispersion of a large amount is preferable. As explained above, Pt, Rh, and Ce act to promote refinement of this 211 phase. Further, as pinning centers, $BaCeO_3$, $BaSiO_3$, $BaGeO_3$, $BaSnO_3$, and other possibilities are known. Further, the 211 phase and other nonsuperconducting phases finely disperse in the easily cleavable 123 phase and thereby play the important role of mechanically strengthening the superconductor material to make the superconductor material viable as a bulk material.

The ratio of the 211 phase in the 123 phase is preferably 5 to 35 vol % from the viewpoint of the $J_c$ characteristic and mechanical strength. Further, the material generally contains voids (air bubbles) of 50 to 500 μm or so in a range of 5 to 20 vol %. Furthermore, when adding Ag, depending on the amount of addition, Ag or an Ag compound of 1 to 500 μm or so is contained in a range of over 0 vol % to 25 vol %.

Further, the oxygen deficiency (x) of the material after crystal growth shows the temperature change of the semiconductor-like resistance at 0.5 or so. By annealing the material having such that oxygen deficiency by each RE system at 350° C. to 600° C. for 100 hours or so in an oxygen atmosphere, oxygen is taken up into the material, the oxygen deficiency (x) becomes 0.2 or less, and a good superconducting characteristic is shown. At this time, a twin structure can be formed in the superconducting phase. However, including this matter, here, it will be called a single-crystal form.

Below, a superconducting bulk magnet according to an embodiment of the present invention will be explained along with FIG. 1. FIG. 1 is a schematic disassembled perspective view showing one example of a superconducting bulk magnet.

Figure 2A:
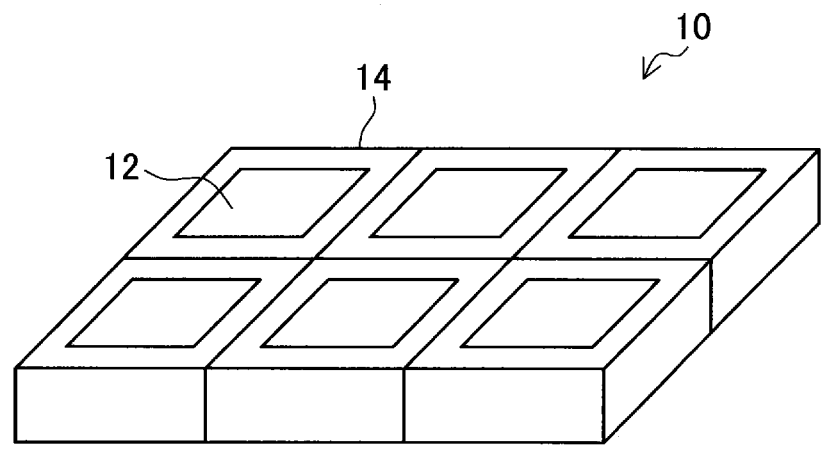
FIG. 2A is a schematic perspective view showing one example of a conventional oxide superconducting bulk magnet and showing a configuration in which the individual oxide superconducting bulk materials have reinforcing members fit over the peripheral parts.
Figure 2B:
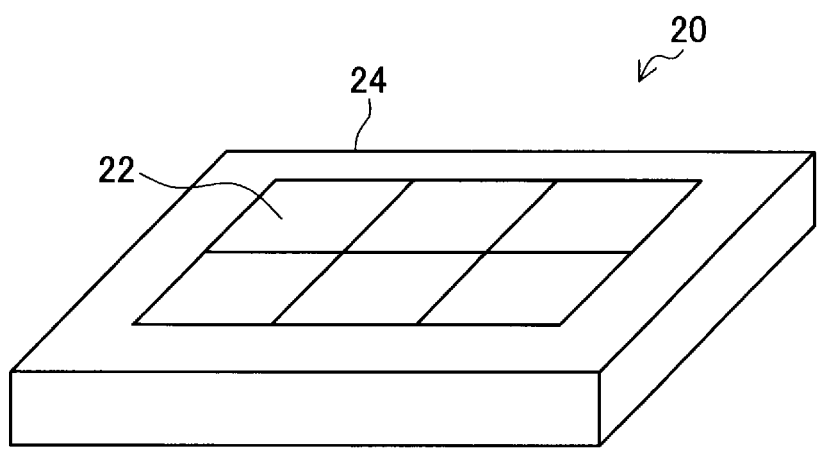
FIG. 2B is a schematic perspective view showing one example of a conventional oxide superconducting bulk magnet and showing a configuration in which the peripheral parts of the plurality of bulk materials have a reinforcing member fit over them.

In explaining the superconducting bulk magnet according to the present embodiment, for comparison, FIGS. 2A and 2B will be used to explain examples of the configurations of conventional superconducting bulk magnets. FIG. 2A and FIG. 2B are both schematic perspective views showing examples of conventional oxide superconducting bulk magnets. First, in the superconducting bulk magnet 10 shown in FIG. 2A, the individual rectangular shaped superconducting bulk materials 12 are respectively surrounded by thick metal reinforcing materials 14. By adopting such a configuration, it is possible to prevent breakage of the superconducting bulk materials 12, but the superconducting bulk materials 12 are arranged discretely and the effect of integrally joining the plurality of superconducting bulk materials 12 is small.

On the other hand, in the superconducting bulk magnet 20 shown in FIG. 2B, a plurality of superconducting bulk materials 22 are arranged closely.

The outer circumference of the assembly is surrounded by a thick metal reinforcing material 24. By adopting such a configuration, compared with FIG. 2A, the overall magnetic field strength and the total amount of magnetic flux per unit area can be expected to be made larger, but there is the problem that in the process of magnetization, some of the superconducting bulk materials 22 forming the assembly will break.

The present inventors investigated in depth the causes of the breakage and as a result discovered that when using a plurality of superconducting bulk materials to form a superconducting bulk magnet, during the process of magnetization, an extremely large repulsive force acts between the individual superconducting bulk materials. Further, it was also learned that since there are variations in shape and performance between the individual oxide superconducting bulk materials, variations also occur in the local generation of stress. Due to the repulsive force, slight clearances are sometimes formed between the individual superconducting bulk materials. Due to such variations, the clearances are not formed uniformly. At some superconducting bulk materials, locally excessive stress acts. As a result, as shown in FIG.

2B, when forming a superconducting bulk magnet by a plurality of oxide superconducting bulk materials, it was learned that some of the superconducting bulk materials forming the assembly break.

Therefore, to prevent such breakage of the superconducting bulk materials, it is necessary to provide not only an assembly side surface reinforcing member arranged at the side surfaces of the assembly formed by the plurality of superconducting bulk materials, but also provide respective reinforcing members (reinforcing frames) around (at the side surfaces of) the individual superconducting bulk materials so as to absorb the above variations. Note that, to secure the overall magnetic field strength and total amount of magnetic flux per unit area of the superconducting bulk magnet, the thicknesses of the reinforcing frames provided at the side surfaces of the superconducting bulk materials are preferably 5.0 mm or less, more preferably 3.0 mm or less, still more preferably 1.0 mm or less. However, even if just setting the reinforcing frames, it was not possible to prevent breakage of the superconducting bulk materials. As explained above, a repulsive force acts between the superconducting bulk materials. For this reason, even if arranging the assembly side surface reinforcing member at the side surfaces of the assembly comprising the superconducting bulk materials combined, positions where stress locally concentrates end up being formed at the assembly. At this time, if the top surface or the bottom surface of the assembly is free, it is believed the release of stress causes superconducting bulk materials to break.

Therefore, the superconducting bulk magnet according to the present embodiment has bulk material reinforcing members at the side surfaces of the individual superconducting bulk materials, has an assembly side surface reinforcing member at the side surfaces of the assembly of the superconducting bulk materials, and furthermore has reinforcing members covering the entire top surface and bottom surface of the assembly of the superconducting bulk materials. That is, as shown in FIG. 1, the superconducting bulk magnet according to the present embodiment 100 has a structure wherein bulk material reinforcing members 120 is fit over the side surfaces of the individual superconducting bulk materials 110 which are arranged to form an assembly, wherein an assembly side surface reinforcing member 130 is arranged at the side surfaces of the assembly, wherein an assembly top reinforcing member 140 and assembly bottom reinforcing member 150 are placed at the top surface and bottom surface of the assembly, and wherein the above-mentioned reinforcing members are fastened at a plurality of locations at the circumferences by fastening members (not shown), and thereby the assembly side surface reinforcing member 130, assembly top reinforcing member 140 and assembly bottom reinforcing member 150 are fastened to form an integral unit.

Note that, in FIG. 1, the case where there are six superconducting bulk materials 110 fit into bulk material reinforcing members 120 (below, these together referred to as "bulk material units") is shown, but the present invention is not limited to this example. For example, the action and effect of the present invention are similar even with five or seven bulk material units etc.

The bulk material reinforcing members 120 are hollow members fitting with the side shapes of the superconducting bulk materials 110 and are provided at the side surfaces of the superconducting bulk materials 110. The difference in the coefficient of thermal expansion of the bulk material reinforcing members 120 and the coefficient of thermal expansion of the superconducting bulk materials 110 is utilized so that at the time of cooling, the bulk material reinforcing members 120 press against and reinforce the side surfaces of the oxide superconducting bulk materials 110 to thereby counter the hoop stresses of the individual oxide superconducting bulk materials 110 and suppress breakage as an effect. Further, even if the superconducting bulk materials 110 are provided with the bulk material reinforcing members 120, the top surface and bottom surface are exposed from the bulk material reinforcing members 120.

Figure 3A:
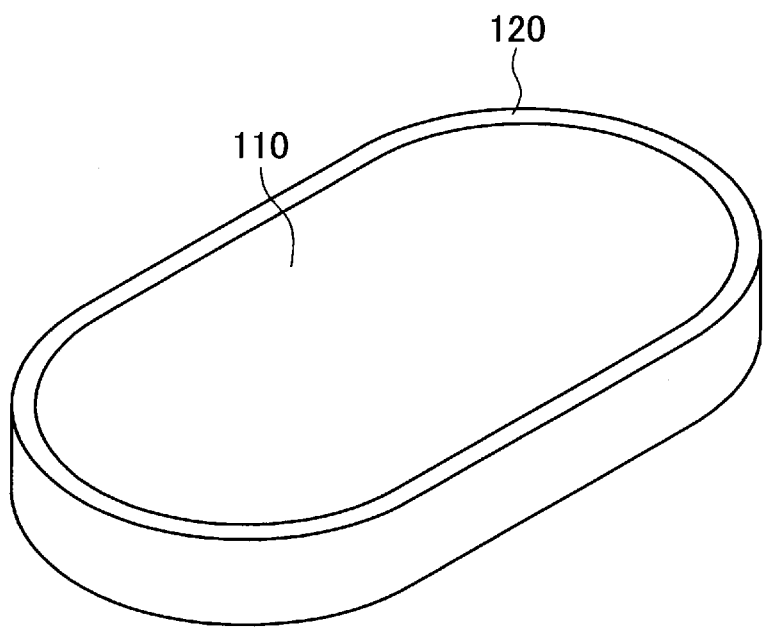
FIG. 3A is a perspective view showing a racetrack shape superconducting bulk material over which a bulk material reinforcing member is fit according to one embodiment of the present invention.

Here, to verify the effect of reducing the maximum stress (hoop stress) in the oxide superconducting bulk materials at the time of magnetization of the bulk material units each comprising a racetrack shaped oxide superconducting bulk material shown in FIG. 3A over which a racetrack shaped stainless steel metal ring (bulk material reinforcing member) is fit, the relationship between the thickness of the metal ring and the effect of reduction of the maximum stress was calculated by numerical analysis. Table 1 shows the thickness dependency of the bulk material reinforcing members.

TABLE 1

| | | | |
|---|---|---|---|
| Thickness of bulk material reinforcing members (mm) | 5.0 | 2.5 | 1.0 |
| Effect of reducing maximum stress (%) | 100 | 90 | 65 |

When defining the effect of reduction of the maximum stress in the case of bulk material reinforcing members of a thickness of 5.0 mm as 100%, it was learned that there is a 65% effect even with a thickness of 1.0 mm. Therefore, to reduce the hoop stress, the bulk material reinforcing members are preferably thick. However, as explained above, when increasing the magnetic field strength which the superconducting bulk magnet generates and total amount of magnetic flux per unit area or when the installation area of the oxide superconducting bulk materials including the bulk material reinforcing members is limited, the bulk material reinforcing members are preferably thin.

The bulk material reinforcing members 120 as explained above are preferably made a thickness of 5.0 mm or less, more preferably 3.0 mm or less, still more preferably 1.0 mm or less, so as to hold the magnetic field strength or total amount of magnetic flux per unit area demanded from the superconducting bulk magnet 100. As the material of the bulk material reinforcing members 120, one having sufficient strength such as stainless steel, titanium alloy, copper alloy, aluminum alloy, etc. is preferable. The lower limit value of the thickness of the bulk material reinforcing members 120 is determined in accordance with the strengths of these materials.

The bulk material reinforcing members can be prepared by a lathe, machining center, electrodischarge machine, or other ordinary metal working machine. Furthermore, the oxide superconducting bulk materials and the bulk material reinforcing members can be joined by a resin, joined by solder, joined by grease, etc. Further, the bulk material reinforcing members can ease the excessive stress which, as explained above, locally acts on part of the oxide superconducting bulk materials due to non-uniform formation of clearances between them, thus leading to the effect of preventing breakage of the bulk materials.

Further, in the above embodiments, if using the superconducting bulk materials with the bulk material reinforcing members detached, the superconducting bulk materials broke. This is believed to be because, as explained above, limited unevenness in the outside shapes of the superconducting bulk materials is unavoidable in working the superconducting bulk materials, positions where the stress concentrates are formed between adjoining superconducting bulk materials, and therefore breakage of the non-elastic superconducting bulk materials is caused. Therefore, it is guessed that the bulk material reinforcing members provided at the side surfaces of the superconducting bulk materials act to ease such stress.

Therefore, a plurality of bulk material units are arranged and an assembly formed. At this time, the top surfaces of the superconducting bulk materials 110 are aligned in the same direction and the bulk material reinforcing members 120 of the adjoining superconducting bulk materials 110 are brought into contact to form the assembly. For example, as shown in FIG. 1, it is also possible to arrange six superconducting bulk materials 110 provided with bulk material reinforcing members 120 in a 2×3 array to form an assembly. The assembly is constrained by the side surfaces of the assembly contacting the inner circumferential surfaces of the assembly side surface reinforcing member 130 corresponding to the shapes of the side surfaces.

Further, the assembly side surface reinforcing member 130 is formed to a thickness greater than the bulk material reinforcing members. For example, it is a thickness of 5 mm or more suitably selected considering the size of the superconducting bulk magnet as a whole, etc. Furthermore, connecting the assembly side surface reinforcing member 130 with both the assembly top reinforcing member 140 and assembly bottom reinforcing member 150 is necessary for securing the strength. In particular, this is necessary for dealing with the bending or twisting stress. However, there is no need for connection over the entire circumference of the side surfaces. The ratio of the part connected in the circumferential direction may be 50% or more, preferably 70% or more, more preferably 90% or more, further preferably 100%. Furthermore, the height of the parts of the assembly side surface reinforcing member 130 contacting the side surfaces of the assembly has to be at least the height of the assembly, that is, the height of the bulk units.

This is because if the height of the assembly side surface reinforcing member 130 is lower than the height of the assembly over the entire circumference, the assembly side surface reinforcing member 130 can no longer be connected with the assembly top reinforcing member 140 and assembly bottom reinforcing member 150, so a sufficient bonding force can no longer be obtained. Therefore, the height of the part of the assembly side surface reinforcing member 130 contacting the side surfaces of the assembly is preferably substantially the same as the height of the assembly, that is, the height of the bulk units. Further, the height of the assembly side surface reinforcing member 130 may also be higher than the height of the bulk units. At that time, a clearance forms between the top surfaces of the bulk material units and the bottom surface of the assembly top reinforcing member 140 or between the bottom surfaces of the bulk material units and the top surface of the assembly bottom reinforcing member 140, but this clearance may be filled with solder, resin, grease, etc. However, if the clearance is too high, sometimes the bulk material units cannot be sufficiently fastened, so all of these clearances are preferably 10 mm or less, more preferably 1 mm or less. Furthermore, the bulk units may be exposed by openings at parts of the assembly side surface reinforcing member as well.

Here, as the difference from PLT 6, in PLT 6, the assembly side surface reinforcing member and assembly top reinforcing member are integrally joined, but the assembly bottom reinforcing member is not integrally joined. Further, almost all of the side surfaces of the assembly are exposed. They are not covered by the assembly side surface reinforcing member.

In the present invention, the side surfaces of the assembly are covered by the assembly side surface reinforcing member, the top surface and bottom surface of the assembly are respectively covered by the assembly top reinforcing member and assembly bottom reinforcing member, and the assembly side surface reinforcing member, assembly top reinforcing member, and assembly bottom reinforcing member are joined into an integral unit.

The function of preventing breakage due not to hoop stress generated at the individual oxide superconducting bulk materials, but hoop stress-like electromagnetic stress generated in the oxide superconducting bulk magnet as a whole as an assembly of the oxide superconducting bulk materials is handled by the thick assembly side surface reinforcing member surrounding the assembly of the plurality of oxide superconducting bulk materials.

The material of the assembly side surface reinforcing member 130 is not particularly limited. For example, it may be the same material as the bulk material reinforcing members 120 or may be a different one. Specifically, the sufficiently strong stainless steel, titanium alloy, copper alloy, or aluminum alloy is preferable. The assembly reinforcing members can be prepared by a lathe, machining center, electrodischarge machine, or other ordinary metal working machine. Furthermore, these members and bulk material units can for example be joined by a resin, joined by solder, joined by grease, etc. Further, to bury the clearances between these members and bulk material units, it is effective to fill the clearances with a resin, solder, grease, etc.

At the assembly of bulk material units which are surrounded by the assembly side surface reinforcing member 130 and formed into an integral unit, furthermore, the assembly top reinforcing member 140 and assembly bottom reinforcing member 150 are fastened to the top surface and bottom surface of the assembly. Specifically, the assembly top reinforcing member 140 and assembly bottom reinforcing member 150 are fastened to be integrally joined with the assembly side surface reinforcing member so as to prevent the stress from being released from positions where stress locally concentrated at the assembly. The thicknesses of the assembly top surface reinforcing member and assembly bottom surface reinforcing member are preferably 2 mm or more or thicker than the thickness of the bulk material reinforcing members. If the assembly side surface reinforcing member 130 and reinforcing plates 140, 150 are fastened to form an integral unit, the fastening means is not particularly limited. For example, bolts or other fastening members may be used or soldering or other bonding means may be used.

Further, it is also possible to set oxide superconducting bulk materials in a container comprising the assembly side surface reinforcing member and assembly bottom reinforcing member joined into an integral unit and fasten the assembly top reinforcing member to the container. As the means for fastening the container and the assembly top reinforcing member, the above-mentioned fastening means may be used.

Alternatively, it is also possible to place a container comprising the assembly side surface reinforcing member and assembly top reinforcing member joined into an integral unit over the oxide superconducting bulk materials arranged on the assembly bottom reinforcing member and then fasten the container and assembly bottom reinforcing member. As the means for fastening the container and the assembly bottom reinforcing member, the above-mentioned fastening means may be used.

In FIG. 1, bolts or other fastening members (not shown) are used for fastening the assembly side surface reinforcing member and the top and bottom surface reinforcing members together. For this reason, the top surfaces and bottom surfaces of the assembly side surface reinforcing member 130 and the assembly top reinforcing member 140 and assembly bottom reinforcing member 150 are formed with pluralities of fastening holes 132, 142, and 152 at positions where the bolts are to be inserted. The bolt diameters, bolting intervals, intervals between bolts, etc. are design matters and may be suitably designed so that sufficient strength is obtained corresponding to the shape or size of the oxide superconducting bulk magnet 100.

In the example shown in FIG. 1, the fastening holes 132 are formed at each of the top surface and bottom surface of the assembly side surface reinforcing member 130 at the four corners and positions where the adjoining superconducting bulk materials 110 contact, for a total of 10 locations. Further, the fastening holes 142, 152 are formed as through holes at positions corresponding to the fastening holes 132 of the top surface and bottom surface of the assembly side surface reinforcing member 130. Note that, in FIG. 1, two through holes are also formed other than at the outer circumferences of the assembly top reinforcing member 140 and assembly bottom reinforcing member 150, but the example utilizing these through holes will be explained later.

In this way, the superconducting bulk magnet according to the present embodiment 100 is configured to reinforce by an assembly side surface reinforcing member 130 an assembly formed by arrangement of a plurality of bulk material units contacting each other and to cover the top surface and bottom surface of the assembly by an assembly top reinforcing member 140 and assembly bottom reinforcing member 150 and fasten them to the assembly side surface reinforcing member 130 to form an integral unit.

In the superconducting bulk magnet having such a configuration, the bulk material reinforcing members 120 and assembly side surface reinforcing member 130 can prevent excessive force from locally acting on part of the superconducting bulk materials 110 forming the assembly. As a result, it is possible to prevent breakage of all superconducting bulk materials 110 forming the superconducting bulk magnet.

Further, when applying the oxide superconducting bulk magnet of the present invention to rotary equipment etc., situations occur where the assembly top reinforcing member and assembly bottom reinforcing member are not necessarily configured symmetrically at the top and bottom. Specifically, the situation may be illustrated of cooling the bulk magnet from the assembly bottom reinforcing member side, generating a magnetic field, and making the space for active use of the generated magnetic field at the side of the assembly top reinforcing member. At this time, the assembly bottom reinforcing member is made from an oxygen-free copper plate with good thermal conductivity etc. while the assembly top surface reinforcing member is made a nonmagnetic material not obstructing the magnetic field such as a stainless steel plate.

In such a case, since oxygen-free copper and stainless steel differ in coefficient of thermal expansion and mechanical strength as well, in addition to a force pushing the bulk material reinforcing members apart outward, a force trying to bend the oxide superconducting bulk magnet as a whole or a force trying to twist it acts.

To counter such a bending or twisting force as well, as explained above, it is effective to strongly fasten the assembly side surface reinforcing member 130 with the assembly top reinforcing member 140 and assembly bottom reinforcing member 150 to join them in an integral unit. This will be explained in further detail below.

The superconducting bulk magnet according to the present embodiment stresses application to the magnetic pole of a generator, motor, or other rotary equipment. In such rotary equipment, it is necessary to put the magnetic flux generated by the oxide superconducting bulk magnet attached to the rotor efficiently across the windings of the stator positioned at the outside of the rotor (assembly top surface reinforcing plate side).

At this time, to cool the oxide superconducting bulk magnet quickly to a uniform temperature, the assembly bottom reinforcing member forming the surface attached to the rotor should be made of a material with a good thermal conductivity.

On the other hand, to put the magnetic flux efficiently across the windings of the stator, it is necessary to reduce the gap between the oxide superconducting bulk magnet and the surface of the windings at the stator side to an order of several mm. To secure the gap, the thickness of the assembly top reinforcing member must be kept to several mm as well. It is necessary to counter the large electromagnetic stress generated from the oxide superconducting bulk magnet, so a high strength, nonmagnetic material is sought.

Therefore, the material of the assembly top reinforcing member differs from the material of the assembly bottom reinforcing member. The assembly bottom reinforcing member is preferably configured from a material with a thermal conductivity of 50 W/m·K or more. Specifically, copper, copper alloy, aluminum, or an aluminum alloy is preferable.

The assembly top reinforcing member is required to be higher in strength than the assembly bottom reinforcing member. Specifically, the yield strength at room temperature (300K) is preferably 200 MPa or more. As the specific material, stainless steel, a titanium alloy, copper alloy, aluminum alloy, etc. may be illustrated.

The assembly top reinforcing member and assembly bottom reinforcing member can be fabricated by a lathe, machining center, electrodischarge machine, or other usual metal working machine. Furthermore, these members and the bulk material units can for example be joined by a resin, joined by solder, joined by grease, etc. Further, to fill the clearances between these members and the bulk material units, filling a resin, solder, grease, etc. is effective.

The present inventors thought of more reliably and effectively preventing the effects of bending or twisting force acting on the bulk magnet due to the difference in the materials of the assembly top reinforcing member and assembly bottom reinforcing member by fastening the assembly top reinforcing member and assembly bottom reinforcing member to the assembly side surface reinforcing member and further fastening the assembly top reinforcing member and assembly bottom reinforcing member not only at the flat outer circumference of the superconducting bulk magnet, but also through the inside of the assembly. Specifically, the inventors thought of increasing the bolts and other fastening members inside the assembly. However, the assembly of the superconducting bulk materials according to the present embodiment secures a sufficient total amount of magnetic flux by a limited area by the individual superconducting bulk materials being arranged densely separated by the bulk material reinforcing members. There is no space for passing through bolts at the insides of the assembly side surface reinforcing members (inside of assembly).

Therefore, in the present embodiment, as shown in FIG. 1, when combining hexagonal shaped superconducting bulk materials with chamfered corners to form an assembly, fastening members for fastening the assembly top reinforcing member and assembly bottom reinforcing member are arranged in the spaces formed by the chamfering (reference numeral 162) and the two reinforcing members are fastened to strongly fasten the assembly. As a result, even if the bulk material reinforcing members are thin, it is possible to substantially completely prevent breakage of the superconducting bulk materials. Further, when using rectangular (square) superconducting bulk materials not chamfered, stress generated from the repulsive force easily concentrates at the corner parts and breakage easily occurs. By chamfering the side surfaces of the superconducting bulk materials, the secondary effect can be obtained of also eliminating such factors of breakage.

Figure 4:
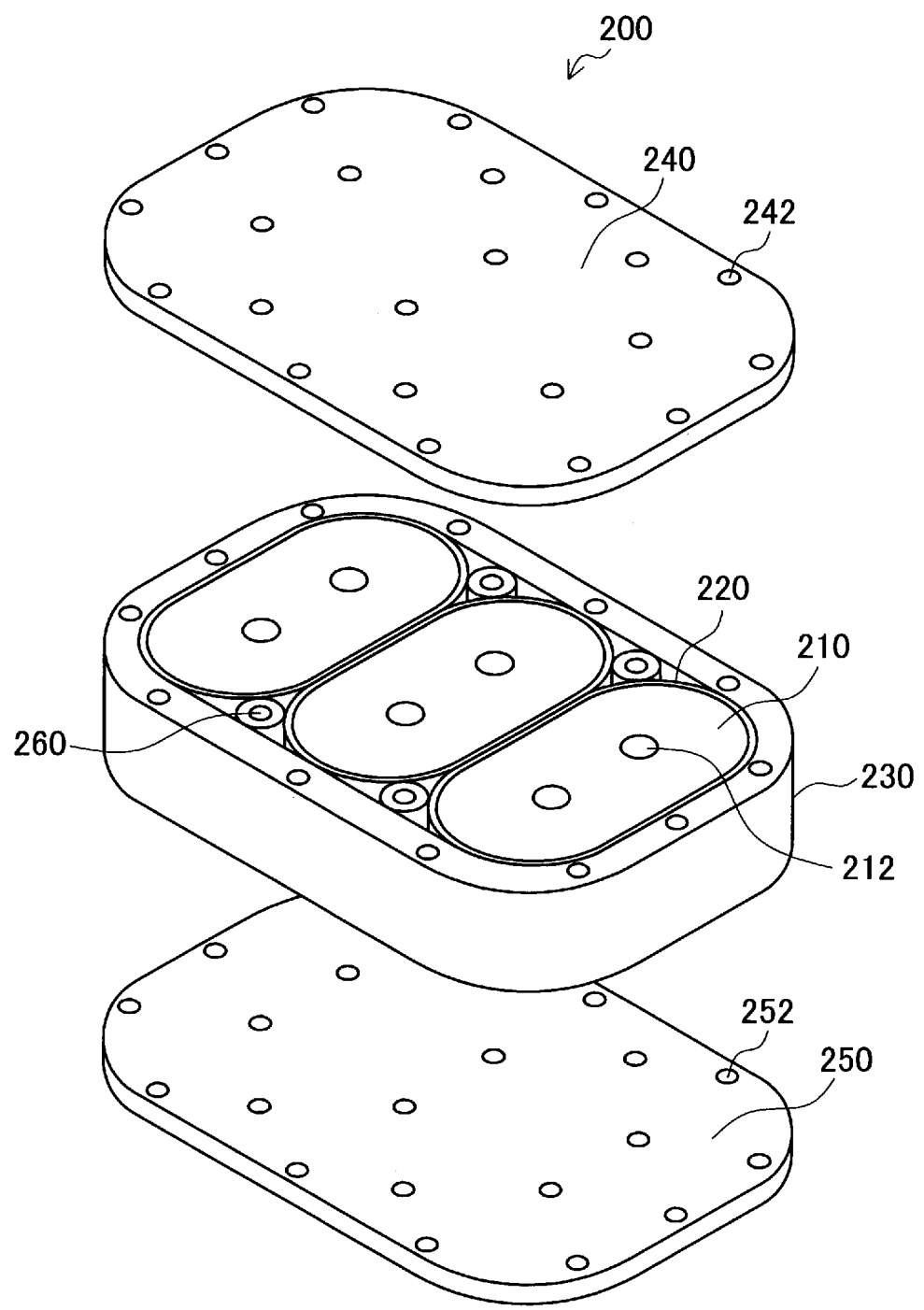
FIG. 4 is a disassembled perspective view showing another example of an oxide superconducting bulk magnet according to the present embodiment.

Further, as other means for fastening the assembly top reinforcing member and the assembly bottom reinforcing member inside the bulk magnet, for example, as shown in FIG. 4, it is possible to form through holes 212 passing through the oxide superconducting bulk materials 210 in the height direction thereof and form through holes at positions corresponding to the through holes 212 at the assembly top reinforcing member 240 and assembly bottom reinforcing member 250 as well. Due to this structure, it is possible to fasten the oxide superconducting bulk materials 210 and assembly top reinforcing member 240 and assembly bottom reinforcing member 250 by bolts or other fastening members at the positions of the through holes 212 of the oxide superconducting bulk materials 210 as well. Therefore, as shown in FIG. 1, compared with connecting and fastening the assembly top reinforcing member 140 and assembly bottom reinforcing member 150 through only the part of the assembly side surface reinforcing member 130, it is possible to connect and fasten these more strongly.

Thus, by fastening the assembly top reinforcing member and the assembly bottom reinforcing member to firmly fasten the assembly inside the superconducting bulk magnet, it is possible to suppress uneven strain of the oxide superconducting bulk magnet as a whole and furthermore possible to suppress breakage of the inside oxide superconducting bulk materials.

The shape of the oxide superconducting bulk materials forming the superconducting bulk magnet in the present embodiment is not particularly limited. For example, the oxide superconducting bulk materials may be a polygonal shape of a triangular shape or more in a plan view.

Figure 5:
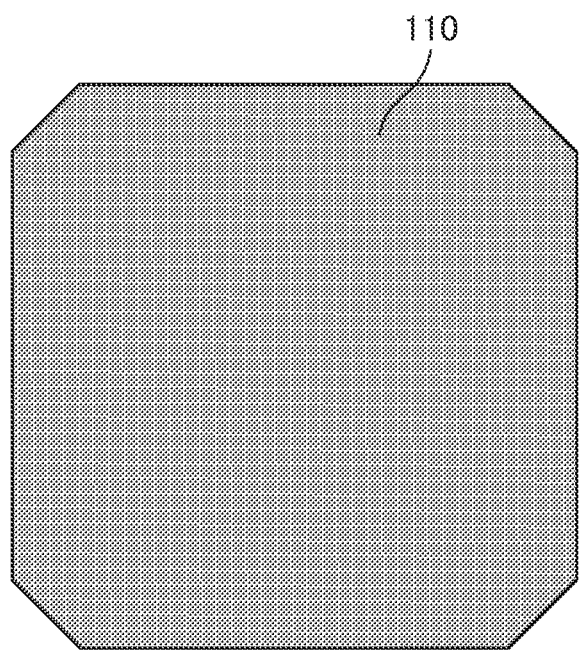
FIG. 5 is a plan view showing a chamfered octagonal shaped superconducting bulk material according to one embodiment of the present invention.

FIG. 5 is a plan view in the present embodiment showing an example where the superconducting bulk materials forming the superconducting bulk magnet are octagonal in plan view.

Explained in more detail, the superconducting bulk materials 110 are columnar shaped. As shown in FIG. 5, when viewed in a plan view, they are squares with corners chamfered to form octagonal shapes. Note that, the superconducting bulk materials 110 according to the present embodiment are square shapes with four corners chamfered to form octagonal shapes, but the superconducting bulk materials 110 used for the superconducting bulk magnet according to the present embodiment 100 may also be square shapes without chamfered corners. Note that, the stress generated due to the repulsive force easily concentrates at the four corners of the superconducting bulk materials 110. Breaks may occur from the parts where the stress concentrates.

By chamfering the side surfaces of the superconducting bulk materials 110, the secondary effect can also be obtained that such causes of fracture can also be removed.

Figure 9:
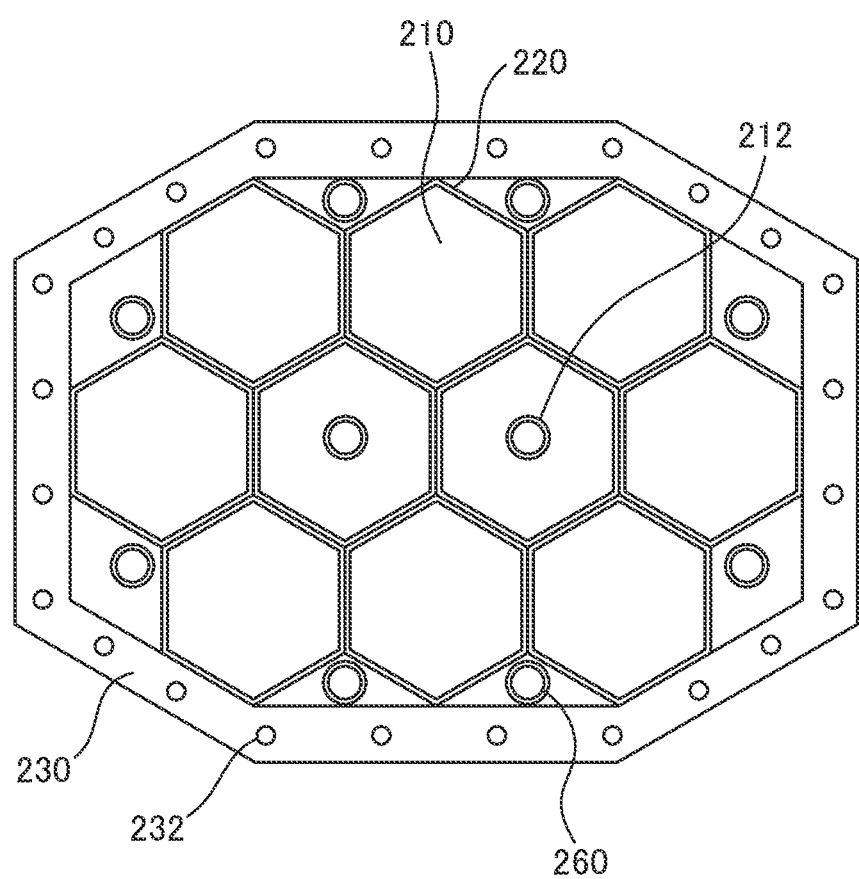
FIG. 9 is a plan view showing an assembly of hexagonal shaped oxide superconducting bulk materials at which bulk material reinforcing members are arranged according to the present embodiment.

Further, FIG. 9 is a plan view in the present embodiment showing an example where the superconducting bulk materials forming the superconducting bulk magnet are hexagonal in shape in plan view.

By making the shapes of the oxide superconducting bulk materials hexagonal columnar shapes, when arranging a plurality of oxide superconducting bulk materials to form an assembly, arrangement without clearance becomes possible. As a result, it is possible to sufficiently raise the overall magnetic field strength and total amount of magnetic flux per unit area. Further, compared with square columnar shapes, they are closer to circular columns, so the trapped magnetic field characteristics are better than the square columnar shapes.

On the other hand, if compared with square shapes, when arranged without clearances, there is a slight disadvantage in that the end parts will not match. Further, while it is possible to arrange the superconducting bulk materials without clearance to form an assembly, when fastening the assembly top reinforcing member and the assembly bottom reinforcing member at the inside of the bulk magnet as well, it is necessary to form holes in the oxide superconducting bulk materials to form clearances.

Note that, the oxide superconducting bulk materials may have, as shapes seen from a plan view, polygonal shapes with rounded vertices. That is, the corners of the polygonal shapes may be made of curves and may be rounded.

Further, the oxide superconducting bulk materials may have racetrack shapes comprising, in a plan view, a pair of facing parallel lines and a pair of facing curved lines connected together.

Figure 3B:
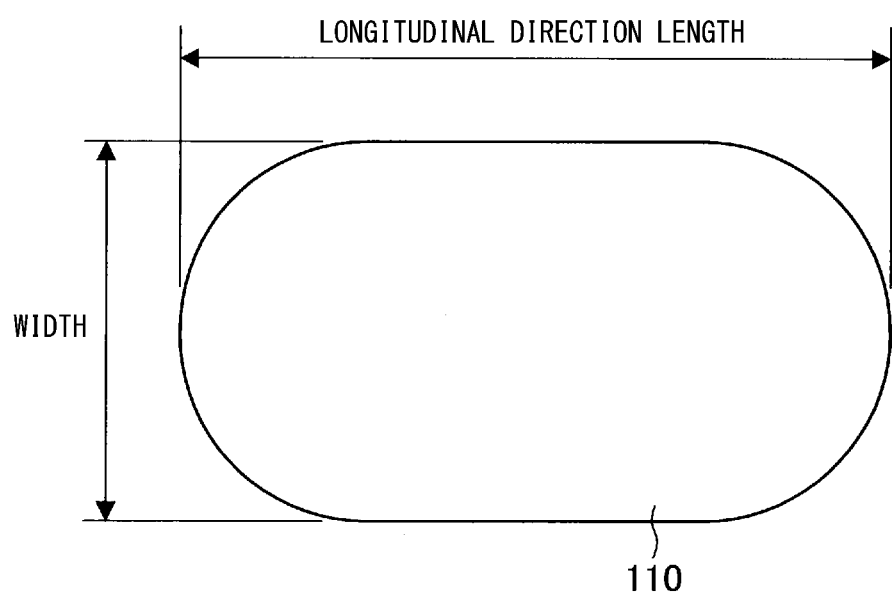
FIG. 3B is an explanatory view for explaining the size of a racetrack shape superconducting bulk material shown in FIG. 3A.
Figure 6:
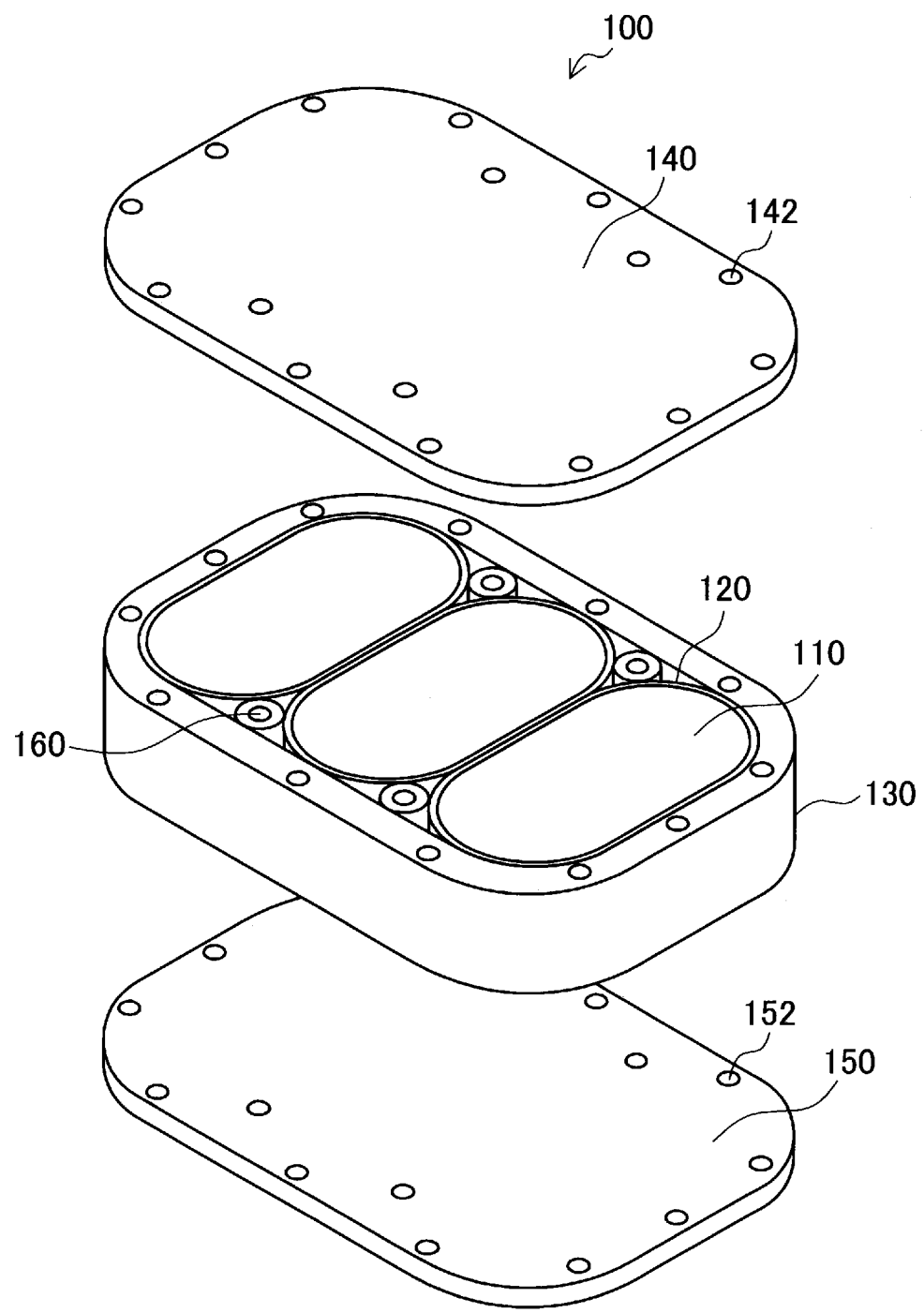
FIG. 6 is a disassembled perspective view showing one example of an oxide superconducting bulk magnet according to the present embodiment.

FIG. 3A is a perspective view showing an example where the superconducting bulk materials forming the superconducting bulk magnet in the present embodiment are racetrack shaped. FIG. 3B is an explanatory view explaining the size of the racetrack shaped superconducting bulk material shown in FIG. 3A. FIG. 6 is a disassembled perspective view showing one example of an oxide superconducting bulk magnet comprising racetrack shaped superconducting bulk materials. On the other hand, FIG. 4, as explained above, is a disassembled perspective view showing one example of an oxide superconducting bulk magnet comprising racetrack shaped superconducting bulk materials formed with through holes.

Each racetrack shaped oxide superconducting bulk material 110, as shown in FIG. 3A, has a top surface, bottom surface, and side surfaces. The side surfaces are formed into a racetrack shape comprising a pair of facing parallel lines and a pair of facing curved lines connected together. Over the side surfaces, a racetrack shaped bulk material reinforcing member 120 is fit. Here, for the racetrack shape, the straight line direction when viewed from the top surface or bottom surface is defined as the "longitudinal direction" while the "longitudinal direction length" and "width" are defined as shown in FIG. 3B.

The oxide superconducting bulk magnet 100 shown in FIG. 6 comprises an assembly formed by arranging a plurality of bulk material units in contact with each other, each of the bulk material units comprising a racetrack shaped oxide superconducting bulk material 110 and bulk material reinforcing member 120, a thick assembly side surface reinforcing member 130 surrounding the side surfaces thereof, an assembly top reinforcing member 140 and assembly bottom reinforcing member 150 covering the top surface and bottom surface of the assembly, and spacers 160 for fastening and affixing these reinforcing members. In the oxide superconducting bulk magnet 200 shown in FIG. 4 as well, except for through holes being formed in the oxide superconducting bulk materials 210, the magnet has a similar configuration to the oxide superconducting bulk magnet 100 shown in FIG. 6.

The spacers 160 and 260 described in FIG. 4 and FIG. 6 are for providing locations for fastening the assembly top reinforcing members 140, 240 and assembly bottom reinforcing members 150, 250 other than the assembly side surface reinforcing members 130, 230. In FIG. 6, the spacers 260 may also be arranged in the through holes 212 of the oxide superconducting bulk materials 210. The spacers 160, 260 are formed with holes at the top or bottom in the height direction. These holes may also be through holes which run from the top to the bottom. Due to this, the assembly top reinforcing members 140, 240 and assembly bottom reinforcing members 150, 250 can be firmly fastened by bolts or other fastening members and can effectively reinforce the oxide superconducting bulk magnets 100, 200.

Note that, as the advantage of making the shape of a single oxide superconducting bulk material a racetrack shape, high uniformity of the distribution of magnetic field in the longitudinal direction may be mentioned. In the superconducting bulk magnet comprising a plurality of oxide superconducting bulk materials, the magnetic fields at the boundary parts of the oxide superconducting bulk materials become inverse to the polarity of the magnetic field at the centers and uneven. Therefore, with the oxide superconducting bulk magnets 100, 200 comprising the racetrack shaped oxide superconducting bulk materials 110, 210 shown in FIG. 6 and FIG. 4, magnetic field distributions with high uniformities in the longitudinal direction are obtained.

Figure 7:
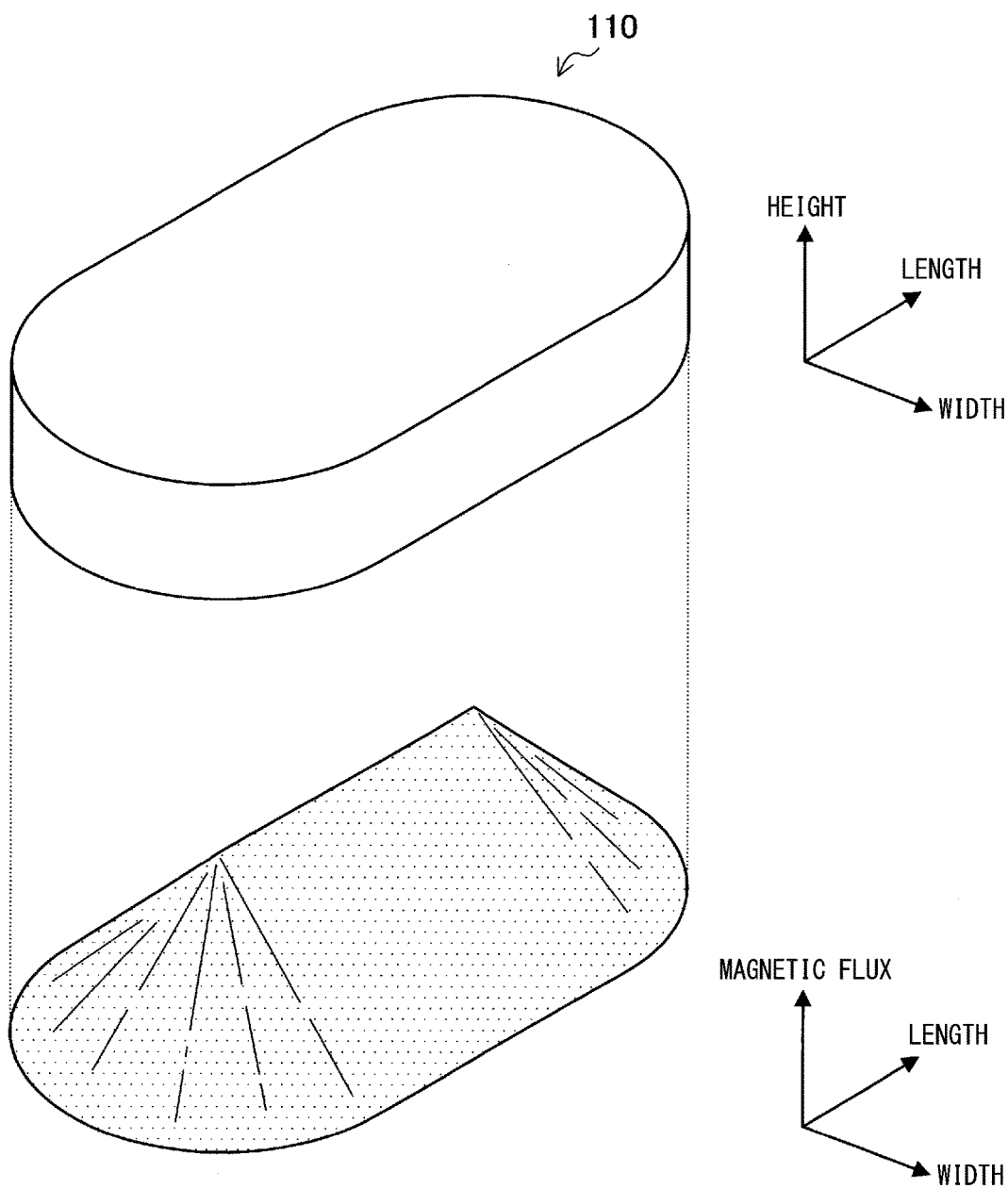
FIG. 7 is an explanatory view showing an example of distribution of the trapped magnetic flux density of a racetrack shape bulk superconducting member.

Further, the distribution of trapped magnetic flux of a single oxide superconducting bulk material differs depending on the magnetization conditions. For example, when using a general superconducting bulk material comprising single-crystal formed $RE_1Ba_2Cu_3O_y$ in which $RE_2BaCuO_5$ is dispersed at the liquid nitrogen temperature (77K), the oxide superconducting bulk material is formed into a racetrack shape such as shown in FIG. 7, the critical current density becomes relatively low. Specifically, if performing magnetization by a static magnetic field in a 5T or so sufficiently high magnetic field, the distribution of magnetic flux density becomes the distribution shown in the lower side of FIG. 7 and the superconducting current flows through the bulk material as a whole.

Figure 8:
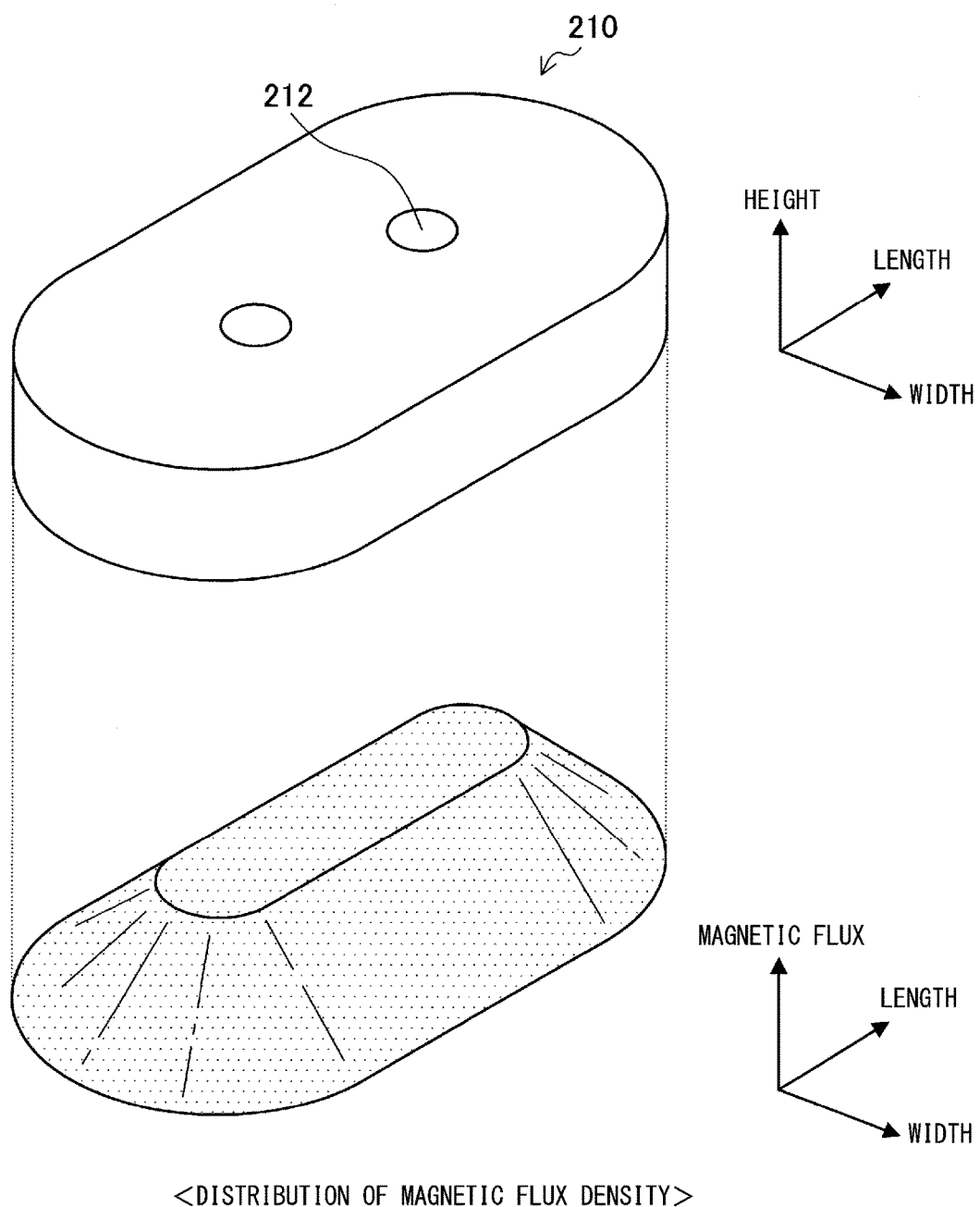
FIG. 8 is an explanatory view showing an example of distribution of the trapped magnetic flux density of a racetrack shape bulk superconducting member with holes.

As opposed to this, at the relatively high critical current density liquid neon temperature (27K), if performing magnetization by a static magnetic field in a 5T or so magnetic field, a large current density superconducting current flows around the bulk materials, so superconducting current does not flow to the center parts. It is possible to trap the magnetic flux density before magnetization of the center parts, so the distribution of magnetic flux density becomes the distribution shown at the bottom side of FIG. 8. Under such a situation, as shown in FIG. 8, even if there is the through hole 212 at the center part of a racetrack shaped oxide superconducting bulk material 210, there is no effect on the distribution of magnetic flux density since no superconducting current flows there. By utilizing this property and, as explained above, providing a through hole 212 at the center part of the racetrack shaped oxide superconducting bulk material 210, inserting a bolt or other fastening means into this through hole 212, and firmly fastening the assembly top reinforcing member 240 and assembly bottom reinforcing member 250, a structure can be obtained which is strong against strain and stress of the oxide superconducting bulk magnet 200. Note that, when directly fastening a fastening member in the through hole 212 formed at the center part of the oxide superconducting bulk material 210, if forming a screw thread in the through hole, the oxide superconducting bulk material 210 is liable to break. In this case, the inside diameter of the through hole 212 may for example be made larger than the diameter of the bolt or other fastening member.

Further, the oxide superconducting bulk materials may have circular columnar shapes.

Figure 10:
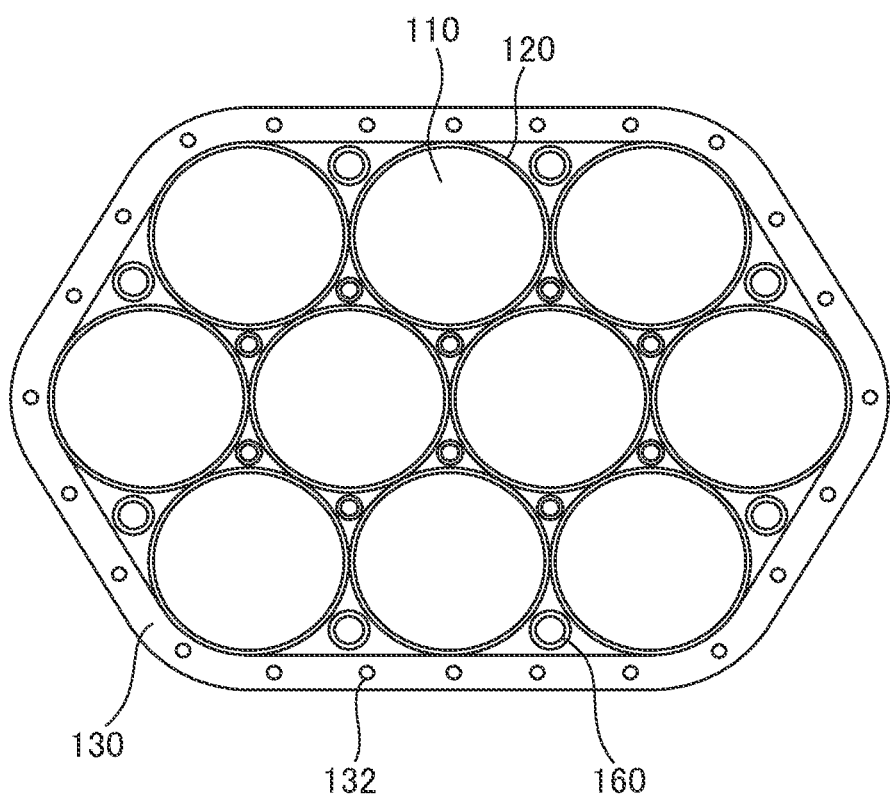
FIG. 10 is a plan view showing an assembly of circular columnar shaped oxide superconducting bulk materials at which bulk material reinforcing members are arranged according to the present embodiment.

FIG. 10 is a plan view showing an example where the superconducting bulk materials forming the superconducting bulk magnet in the present embodiment are circular shapes in a plan view.

By forming the shapes of the oxide superconducting bulk materials into circular columnar shapes, the bulk material reinforcing members arranged at the side surfaces of the oxide superconducting bulk materials can isotropically give high pressure to the oxide superconducting bulk materials and the effect of reduction of the hoop stress is high. Further, the single-crystal formed bulk material obtained by crystal growth is a circular columnar shape, so working is easy and the loss when working the oxide superconducting bulk materials is small, so the yield is good. Furthermore, the trapped magnetic field characteristic is excellent.

Note that, when arranging a plurality of oxide superconducting bulk materials to form an assembly, they cannot be arranged without clearance. Therefore, this is somewhat disadvantageous for increasing the overall magnetic field strength or total amount of magnetic flux per unit area, but it is possible to utilize the clearances to fasten the assembly top reinforcing member and the assembly bottom reinforcing member at the inside of the bulk magnet as well, so it is possible to sufficiently counter the force trying to bend or twist the bulk magnet as a whole.

Figure 11:
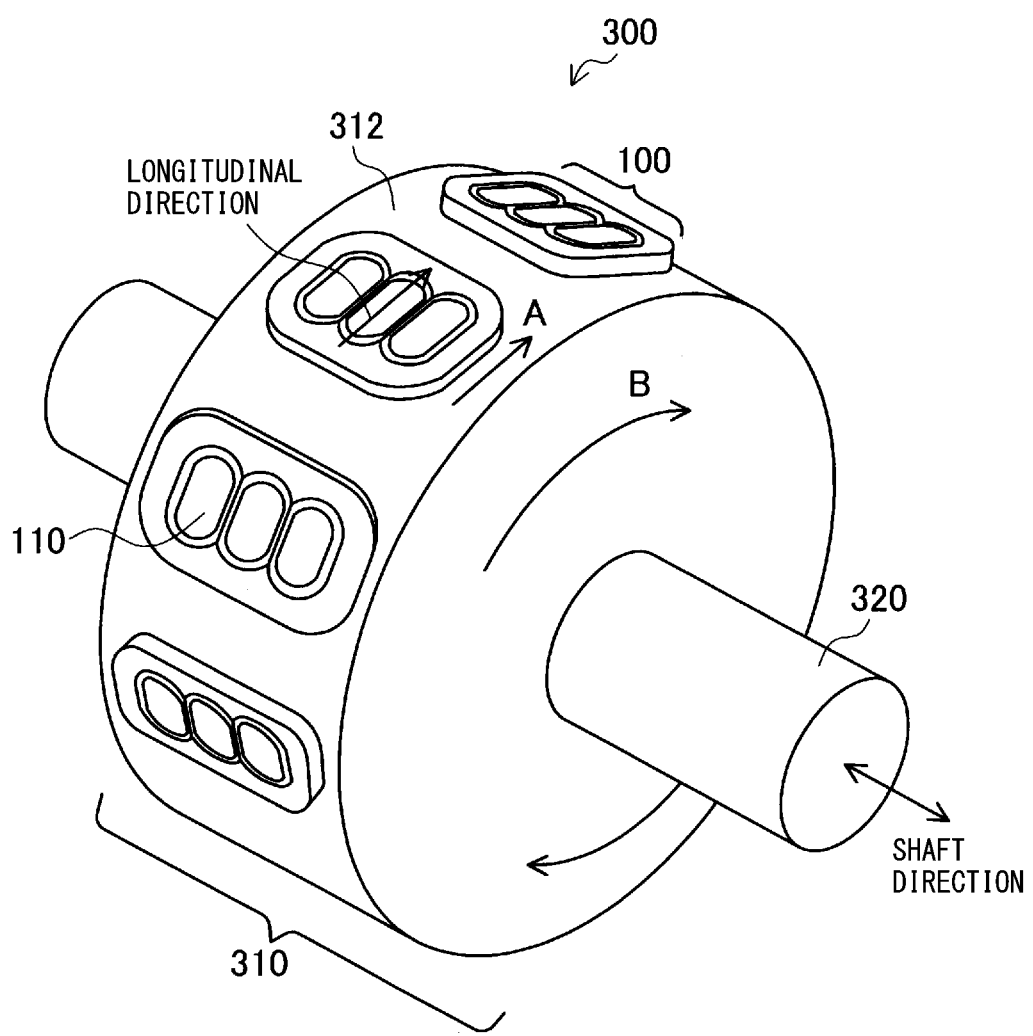
FIG. 11 is a schematic perspective view showing one example of the configuration of a rotor of rotary equipment comprising magnetic poles of oxide superconducting bulk magnets having racetrack shaped oxide superconducting bulk materials.

The oxide superconducting bulk magnets 100, 200 according to the present embodiment comprising the above oxide superconducting bulk materials are excellent as magnetic poles of rotary equipment such as generators or motors as explained above. FIG. 11 shows an example of the configuration of rotary equipment 300 having an oxide superconducting bulk magnet 100 comprising racetrack shaped oxide superconducting bulk materials 110 as a magnetic pole. FIG. 11 shows the state where the assembly top reinforcing member covering the top surface of the assembly of bulk material units is removed. The rotary equipment 300 includes a disk shaped rotor 310 rotating about a shaft 320 and provided at its outer circumferential surface with oxide superconducting bulk magnets 100 at predetermined intervals as magnetic poles. The oxide superconducting bulk magnets 100 are strongly connected to the outer circumferential part of the rotor 310 by bolts etc. In accordance with need, it is possible to connect the oxide superconducting bulk materials 110 to the refrigerant through a copper or aluminum or other high thermally conductive member for cooling the oxide superconducting bulk materials 110 at the assembly bottom reinforcing member in order to convey a suitable amount of cold to the oxide superconducting bulk materials 110.

In FIG. 11, the longitudinal direction of the racetrack shaped oxide superconducting bulk material 110 matches with the direction A of rotational movement of the rotor 310.

That is, the longitudinal direction of the oxide superconducting bulk material 110 becomes vertical to the shaft 320. By making the angle formed between the longitudinal direction of the racetrack shaped oxide superconducting bulk material 110 and the shaft direction vertical, the stator (not shown) facing the magnetic pole intersects with the magnetic flux of the substantially constant magnetic flux density while one magnetic pole is being passed. If the rotational speed is constant, a substantially constant magnetomotive force can be generated. As opposed to this, when the longitudinal direction of the oxide superconducting bulk material 110 is parallel to the shaft direction, the stator experiences a plurality of peaks of magnetic flux density while passing through a single magnetic pole.

The magnetic flux density being constant, if a generator, it is possible to suppress the high harmonic components, while if a motor, it becomes possible to suppress the cogging torque and obtain smooth rotation. Therefore, the fact that the magnetic flux density is constant is a great merit of a magnetic pole which is formed using a racetrack shaped oxide superconducting bulk material 110.

Modifications

In the above embodiments, the superconducting bulk magnet is attached to rotary equipment etc. as a magnetic pole in the state having the assembly bottom reinforcing member. However, if the surface for attachment to the magnetic pole at the rotary equipment etc. is, for example, provided with a cooling plate comprising oxygen-free copper, the superconducting bulk magnet need not have an assembly bottom reinforcing member. That is, when attaching a superconducting bulk magnet not having an assembly bottom reinforcing member to the cooling plate of the rotary equipment and fastening them together to be joined integrally, the above-mentioned configuration of the superconducting bulk magnet can be realized because the superconducting bulk magnet can include the cooling plate. Therefore, the assembly bottom reinforcing member may also be the surface of attachment to the magnetic pole of the rotary equipment etc.

Further, the assembly top reinforcing member may also have curvature. In particular, when the outer diameter of the rotor becomes relatively small, it may also have curvature matched with the inside curved shape of the stator side. Furthermore, in such a case, the flat surface of each oxide superconducting bulk material at the side of the assembly top reinforcing member may also be arranged to follow this curve (that is, so that the flat surface of the center oxide superconducting bulk materials at the assembly top reinforcing member side sticks out at the assembly top reinforcing member side from the flat surface of the surrounding oxide superconducting bulk materials at the assembly top reinforcing member side).

Further, in the above embodiments, the side surfaces of the assembly contact only parts of the assembly side surface reinforcing member. Clearances are formed between the inner circumferential surface of the assembly side surface reinforcing member and the side surfaces of the assembly. However, it is also possible to make the edge parts of the assembly side surface reinforcing member at the assembly side extend to contact the side surfaces of the assembly. By doing this, the side surfaces of the assembly are more firmly fastened by the assembly side surface reinforcing member, so breakage of the superconducting bulk materials forming the assembly can be further effectively prevented.

Above, referring to the attached drawings, preferred embodiments of the present invention were explained in detail, but the present invention is not limited to these embodiments. It is clear that a person with ordinary knowledge in the technical field of the present invention could easily conceive of various changes or corrections within the scope of the technical idea described in the claims. It will be understood that these naturally fall within the technical scope of the present invention.

EXAMPLES

Example 1

In the superconducting bulk magnet of this example, a Gd—Ba—Cu—O-based oxide superconducting bulk material was used. First, commercially available powders of oxides of purity 99.9 mass % gadolinium (Gd), barium (Ba), and copper (Cu) were weighed in a molar ratio of Gd:Ba:Cu=1.6:2.3:3.3. To this, platinum 0.5 mass % and silver 10 mass % were added. This weighed powder was sufficiently kneaded over 1 hour, then was calcined in the atmosphere at 1173K for 8 hours. Next, a mold was used to shape the calcined powder into a disk shape. This shaped article was heated up to 1423K to a molten state and held for 30 minutes, then was seeded in the middle of lowering the temperature. This was gradually cooled in the 1278K to 1252K temperature region over 100 hours to grow a crystal and obtain a diameter 70 mm single-crystal formed superconducting bulk material. The single-crystal superconducting bulk material was worked into the shape shown in FIG. 5 to obtain a side 50 mm and height 20 mm octagonal shape and was heat treated in an oxygen stream at 723K for 100 hours.

Over such side 50 mm square octagonal shaped superconducting bulk materials, as shown in Table 2, in Cases 1-B to 1-E, 0.5 mm, 1 mm, 2 mm, and 2 mm stainless steel SUS316L bulk material reinforcing members were fit. At this time, the superconducting bulk materials were additionally worked to give the same sizes (50 mm square) including the bulk material reinforcing members.

After that, except for Case 1-A, three by two, that is, a total of six, superconducting bulk materials fit with bulk material reinforcing members were arranged in a rectangular shape and the entirety was surrounded by a thickness 5 mm, height 20 mm stainless steel SUS316L assembly side surface reinforcing member. At this time, the superconducting bulk materials, bulk material reinforcing members, and assembly side surface reinforcing member were bonded with each other by an epoxy-based resin (product name: STYCAST 2850FT, made by Ablestik Japan) so as not to shift during the magnetization test. Furthermore, at the bottom surface of the assembly, an assembly bottom reinforcing member comprising an oxygen-free copper plate, while at the top surface, an assembly top reinforcing member comprising a stainless steel SUS316L plate were arranged. On the assembly side surface reinforcing member, a total of 10 locations were bolted to fasten the assembly side surface reinforcing member, assembly top reinforcing member, and assembly bottom reinforcing member integrally. In Cases 1-A to 1-D, furthermore, two locations were bolted inside the assembly.

These superconducting bulk magnets were magnetized by cooling in a magnetic field and measured for magnetic field distribution at 30K. First, under conditions of an external magnetic field of 4T, no breakage of superconducting bulk materials could be seen in any of the superconducting bulk magnets of Cases 1-A to 1-E. However, under conditions of an external magnetic field of 5T, there was no breakage of the superconducting bulk materials at all in the superconducting bulk magnets of Cases 1-B to 1-D, but two out of the six superconducting bulk materials broke in the superconducting bulk magnets of Case 1-A. Further, in Case 1-E, one superconducting bulk material broke.

Further, Table 2 shows a comparison of Cases 1-B to 1-D in the case based on the total amount of magnetic flux of the superconducting bulk magnet of Case 1-A under magnetization conditions of an external magnetic field of 4T. In the case of Cases 1-B and 1-C with thicknesses of the bulk material reinforcing members of 1 mm or less, a total amount of magnetic flux was high since it was confirmed to be 90% or more. Note that, in Table 2, the number of oxide superconducting bulk materials which broke under conditions of an external magnetic field of 5T are shown. From the present test results, it was shown that in a superconducting bulk magnet where the assembly top reinforcing member and the assembly bottom reinforcing member are fastened at the inside of the assembly, breakage of the superconducting bulk materials can be prevented and a strong magnetic field can be generated.

Further, a similar test was conducted without providing reinforcing members at the top surface and bottom surface of the assembly under the same conditions as Cases 1-A to 1-D of Table 2. As a result, in all of the cases of Cases 1-A to 1-D, breakage occurred at one or more oxide superconducting bulk materials.

TABLE 2

|  | 1-A (comp. ex.) | 1-B (inv. ex.) | 1-C (inv. ex.) | 1-D (inv. ex.) | 1-E (inv. ex.) |
| --- | --- | --- | --- | --- | --- |
| Bolting at two locations at the inside | Yes | Yes | Yes | Yes | No |
| Thickness of bulk material reinforcing members | No | 0.5 mm | 1 mm | 2 mm | 2 mm |
| Total amount of magnetic flux (external magnetic field 4T) | 100% (standard) | 95.8% | 92.6% | 84.4% | 84.4% |
| Breaks (number) (external magnetic field 5T) | 2 | 0 | 0 | 0 | 1 |

Example 2

A test similar to Example 1 was performed for the case of combining two by two, that is, a total of four, superconducting bulk materials. In Cases 2-A to 2-D of Table 3, in addition to eight locations of the assembly side surface reinforcing members at the outer circumferences of the flat surfaces of the superconducting bulk magnets, bolts were passed through single locations at the inside of the superconducting bulk magnets and fastened. In the invention example of Case 2-E, no inside bolting was performed. Table 3 shows a comparison in the case based on the total amount of magnetic flux of the superconducting bulk magnet of Case 2-A for the Cases 2-B to 2-E under magnetization conditions of an external magnetic field of 4T.

In the invention examples of Cases 2-B to 2-D, no breakage of the superconducting bulk materials occurred. On the other hand, in the comparative example of Case 2-A in which no bulk material reinforcing members were fit over the individual superconducting bulk materials, breakage occurred at three superconducting bulk materials. Further, in the invention example of Case 2-E, breakage occurred at a single superconducting bulk material.

TABLE 3

|  | 2-A (comp. ex.) | 2-B (inv. ex.) | 2-C (inv. ex.) | 2-D (inv. ex.) | 2-E (inv. ex.) |
| --- | --- | --- | --- | --- | --- |
| Bolting at one location at the inside | Yes | Yes | Yes | Yes | No |
| Thickness of bulk material reinforcing members | No | 0.5 mm | 1 mm | 2 mm | 2 mm |
| Total amount of magnetic flux (based on 2-A) | 100% | 96% | 92% | 86% | 86% |
| Breaks (number) (external magnetic field 5T) | 3 | 0 | 0 | 0 | 1 |

Example 3

In Example 3, a superconducting bulk magnet having the racetrack shaped oxide superconducting bulk materials shown in FIG. 3A was examined. In the oxide superconducting bulk magnet of the present example, Gd(Dy)—Ba—Cu—O-based oxide superconducting bulk materials were used. First, commercially available powders of oxides of purity 99.9 mass % rare earth element (RE), barium (Ba), and copper (Cu) were weighed in a molar ratio of RE:Ba:Cu=1.6:2.3:3.3. To this, $BaCeO_3$ 1.5 mass % and silver 20 mass % were added. This weighed powder was sufficiently kneaded over 1 hour, then calcined in the atmosphere at 1173K for 8 hours. At this time, as the RE composition, four types of calcined powder of (Gd:Dy)=(100:0), (95:5), (90:10), and (85:15) were prepared. These calcined powders were packed in a diameter 200 mm mold concentrically with the (100:0) calcined powder in a diameter 50 mm region, with the (95:5) calcined powder in the surrounding diameter 100 mm region, and furthermore with the (90:10) calcined powder in the surrounding 150 mm region. The remainder was packed with the (85:15) calcined powder and press-formed.

This shaped article was heated to 1423K to a molten state, held for 30 minutes, then seeded in the middle of lowering the temperature. This was gradually cooled in the 1278K to 1252K temperature region over 300 hours to grow a crystal and obtain a diameter 155 mm single-crystal formed oxide superconducting bulk material. The prepared single-crystal formed oxide superconducting bulk material was worked into a racetrack shape (longitudinal direction length 120.0 mm, width 60.0 mm, height 20.0 mm) and was heat-treated in an oxygen stream at 723K for 100 hours.

Over this racetrack shaped oxide superconducting bulk material, a stainless steel SUS316L racetrack shape bulk material reinforcing member (outer circumference longitudinal direction length 122.0 mm and width 62.0 mm, inside circumference longitudinal direction length 120.0 mm and width 60.0 mm, height 20.0 mm, and thickness 1.0 mm) was fit and fastened with resin. Furthermore, two racetrack shaped oxide superconducting bulk materials with bulk material reinforcing members were prepared in the same manner as the above-mentioned manner. These three were packed together and the entirety thereof was surrounded by an assembly side surface reinforcing member of a thickness 10 mm formed from the stainless steel SUS316L (outer circumference longitudinal direction length 206 mm and width 142 mm, inside circumference longitudinal direction length 186 mm and width 122 mm, height 20.0 mm, and thickness 10 mm).

Furthermore, at the top surfaces and bottom surfaces of the bulk material units surrounded by the assembly side surface reinforcing member, a stainless steel SUS316L assembly top reinforcing member and assembly bottom reinforcing member having screw holes (shape of outer circumference same as outer circumference of assembly side surface reinforcing member, thickness 5.0 mm) were arranged and these screwed. Before screwing, the oxide superconducting bulk materials, bulk material reinforcing members, and assembly side surface reinforcing member were buried in a resin (product name: STYCAST 2850FT, made by Ablestik Japan) so as not to shift during the magnetization test.

Next, to compare the effects of the thickness of the bulk material reinforcing members and presence/absence of the thickness of the bulk material reinforcing member, an oxide superconducting bulk magnet with a thickness of the bulk material reinforcing members of zero (that is, no bulk material reinforcing members) (Comparative Example 3-A), an oxide superconducting bulk magnet with a thickness of the bulk material reinforcing members of 0.5 mm (Example 3-B), an oxide superconducting bulk magnet with a thickness of 1.0 mm (Example 3-C), and an oxide superconducting bulk magnet with a thickness of 2.0 mm (Example 3-D) were examined. These were prepared in the same way other than the thickness of the bulk material reinforcing members.

Table 4 shows a comparison in the case based on the total amount of magnetic flux of the oxide superconducting bulk magnet of Comparative Example 3-A under magnetization conditions of an external magnetic field of 5T and the presence of breakage of the oxide superconducting bulk materials at the time of external magnetic field 5T magnetization. In Table 4, when one or more oxide superconducting bulk materials broke under conditions of an external magnetic field of 5T, "Yes" was entered in the field "Breaks". When the thickness of the bulk material reinforcing member was 1 mm or less, the total amount of magnetic flux could be confirmed to be high since it was 90% or more.

Further, regarding breakage of the oxide superconducting bulk materials, first these oxide superconducting bulk magnets were magnetized by cooling in a magnetic field using a refrigerating machine at about 30K and the distribution of the magnetic field was measured. Under conditions of an external magnetic field of 4T, no breakage was seen in any of the oxide superconducting bulk magnets. Next, the external magnetic field was changed to 5T, whereupon the oxide superconducting bulk materials of the oxide superconducting bulk magnets of Examples 3-B to 3-D did not break at all, but the oxide superconducting bulk magnet of Comparative Example 3-A broke.

Therefore, from the test results, it is possible to provide an oxide superconducting bulk magnet comprising a plurality of racetrack shaped superconducting bulk materials having the structure of the present invention in which breakage of the oxide superconducting bulk material is prevented and a strong magnetic field can be generated. Further, it is shown that by making the thickness of the bulk material reinforcing member 1.0 mm or less, a high total amount of magnetic flux can be obtained.

Further, similar tests were run under similar conditions to 3-A to 3-D of Table 4 without the assembly top reinforcing member and assembly bottom reinforcing member. As a result, in the case of all of 3-A to 3-D, breakage of the oxide superconducting bulk materials occurred.

From these test results, it became clear that by arranging an assembly reinforcing member at the outer circumference of the side surfaces of the assembly of the oxide superconducting bulk materials comprising a plurality of racetrack shaped bulk material units, each of which comprises a racetrack shaped oxide superconducting bulk material having the outer circumference into which a racetrack shaped bulk material reinforcing member is fit, and arranging reinforcing members at the top surface and bottom surface of the assembly, the oxide superconducting bulk magnet became an excellent source of generation of a magnetic field.

TABLE 4

|  | 3-A (comp. ex.) | 3-B (inv. ex.) | 3-C (inv. ex.) | 3-D (inv. ex.) |
| --- | --- | --- | --- | --- |
| Thickness of bulk material reinforcing members | No | 0.5 mm | 1 mm | 2 mm |
| Total amount of magnetic flux (5T magnetization) (based on Comparative Example 3-A) | 100% | 96.9% | 93.1% | 87.8% |
| Breaks (external magnetic field 5T) | Yes | No | No | No |

Example 4

In Example 4, an oxide superconducting bulk magnet comprising oxide superconducting bulk materials formed with through holes shown in FIG. 4 was examined. In the oxide superconducting bulk magnet of the present example, Gd(Dy)—Ba—Cu—O-based oxide superconducting bulk materials were used. First, commercially available powders of oxides of purity 99.9 mass % rare earth element (RE), barium (Ba), and copper (Cu) were weighed in a molar ratio of RE:Ba:Cu=1.8:2.4:3.6. To this, $BaCeO_3$ 1.5 mass % and silver 20 mass % were added. This weighed powder was sufficiently kneaded over 1 hour, then calcined in the atmosphere at 1173K for 8 hours. At this time, as the RE composition, four types of calcined powder of (Gd:Dy)= (100:0), (96:4), (92:8), and (88:12) were prepared. These calcined powders were packed in a diameter 200 mm mold concentrically with the (100:0) calcined powder in a diameter 50 mm region, with the (96:4) calcined powder in the surrounding diameter 100 mm region, and furthermore with the (92:8) calcined powder in the surrounding 150 mm region. The remainder was packed with the (88:12) calcined powder and press formed.

This shaped article was heated to 1423K to a molten state, held for 30 minutes, then seeded in the middle of lowering the temperature. This was gradually cooled in the 1278K to 1252K temperature region over 320 hours to grow a crystal and obtain a diameter 155 mm single-crystal formed oxide superconducting bulk material. The prepared single-crystal formed oxide superconducting bulk material was worked into a racetrack shape (longitudinal direction length 110.0 mm, width 70.0 mm, height 20.0 mm). Furthermore, at the center part of the oxide superconducting bulk material, two diameter 10.0 mm through holes were formed in the longitudinal direction with a center interval of 40 mm. After this, the member was heat treated in an oxygen stream at 723K for 100 hours.

Over this racetrack shaped oxide superconducting bulk material, a stainless steel SUS316L racetrack shaped bulk material reinforcing member (outer circumference longitudinal direction length 112.0 mm and width 72.0 mm, inside circumference longitudinal direction length 110.0 mm and width 70.0 mm, height 20.0 mm, and thickness 1.0 mm) was fit and fastened with resin. Furthermore, two racetrack shaped oxide superconducting bulk materials with bulk material reinforcing members were prepared in the same manner as the above-mentioned manner. These three were packed together and the entirety was surrounded by an assembly side surface reinforcing member of a thickness 12 mm formed from the same stainless steel SUS316L (outer circumference longitudinal direction length 240 mm and width 136 mm, inside circumference longitudinal direction length 216 mm and width 112 mm, height 20.0 mm, and thickness 10 mm).

Furthermore, at the top surfaces of the bulk material units surrounded by the assembly side surface reinforcing member, a stainless steel SUS316L (thickness 5.5 mm) assembly top reinforcing member having screw holes was arranged and screwed in. Further, at the bottom surfaces of the bulk material units surrounded by the assembly side surface reinforcing member, an oxygen-free copper (thickness 9.0 mm) assembly bottom reinforcing member having screw holes was arranged and screwed in. Note that, the shapes of the outer circumferences of the assembly top reinforcing member and assembly bottom reinforcing member were the same as the shape of the outer circumference of the assembly side surface reinforcing member. Further, before screwing, the oxide superconducting bulk materials, bulk material reinforcing members, and assembly side surface reinforcing member were buried in a resin (product name: STYCAST 2850FT, made by Ablestik Japan) so as not to shift during the magnetization test.

Next, to compare the effects due to the presence of the bulk material reinforcing members, an oxide superconducting bulk magnet with bulk material reinforcing members of zero thickness (that is, with no bulk material reinforcing members) (Comparative Example 4-A) and an oxide superconducting bulk magnet with bulk material reinforcing members of 1.0 mm thickness (Example 4-C) were examined. There were prepared in the same way other than the thickness of the bulk material reinforcing members.

These superconducting bulk magnets were magnetized by cooling in a magnetic field using a refrigerating machine and were measured for magnet field distribution at about 30K. Under conditions of an external magnetic field of 4.5T, no breaks were seen in any of the oxide superconducting bulk magnets. However, under conditions of an external magnetic field of 5.5T, the oxide superconducting bulk materials did not break at all in the oxide superconducting bulk magnet of Example 4-C, but the oxide superconducting bulk magnet of Comparative Example 4-A broke.

From these test results, it became clear that by arranging an assembly side surface reinforcing member at the outer circumference of the side surfaces of the assembly of the oxide superconducting bulk materials comprising a plurality of racetrack shaped bulk material units, each of which comprises a racetrack shaped oxide superconducting bulk material having a hole part and the outer circumference into which a racetrack shaped bulk material reinforcing member is fit, and fastening the assembly top reinforcing member and assembly bottom reinforcing member to the top surface and bottom surface of the assembly, the oxide superconducting bulk magnet became an excellent source of generation of a magnetic field.

Example 5

In Example 5, an oxide superconducting bulk magnet configured from circular columnar shaped oxide superconducting bulk materials shown in FIG. 10 was examined. In the oxide superconducting bulk magnet of this example, Gd—Ba—Cu—O-based oxide superconducting bulk materials were used. First, commercially available powders of oxides of purity 99.9 mass % gadolinium (Gd), barium (Ba), and copper (Cu) were weighed in a molar ratio of Gd:Ba:Cu=1:2:3. To this, $BaCeO_3$ 1.5 mass % was added and sufficiently mixed, then the mixture was calcined at 1183K for 5 hours in an oxygen stream, then further pulverized and kneaded, then again calcined at 1193K and pulverized to prepare Gd-based 123 phase calcined powder. Further, various similar oxide materials were weighed in a molar ratio of Gd:Ba:Cu=2:1:1. To this, $BaCeO_3$ 1.5 mass % was added and sufficiently mixed, then the mixture was calcined at 1183K for 5 hours in an oxygen stream, then further pulverized and kneaded, then again calcined at 1198K and pulverized to prepare Gd-based 211 phase calcined powder.

These calcined powders were weighed to give a molar ratio of 123:211 of 3:1, then 10 mass % of silver oxide powder was added to prepare mixed powder. This mixed powder was shaped using an inside diameter 65 mm cylindrical shaped mold to prepare a shaped article. This shaped article was heated to render it a semimolten state, then was brought into contact with a seed crystal at 1313K, then was gradually cooled in a temperature region of 1278K to 1255K over 280 hours to grow a crystal and obtain a diameter approximately 51 mm single-crystal formed oxide superconducting bulk material. This was worked into a diameter 50 mm, height 17 mm circular columnar shape which was then heat treated in an oxygen stream at 703K for 100 hours to prepare an oxide superconducting bulk material. Further, a similar method was used to obtain a diameter about 51 mm single-crystal formed oxide superconducting bulk material, then prepare a diameter 47 mm, height 17 mm oxide superconducting bulk material. Still further, a similar method was used to obtain a diameter about 51 mm single-crystal formed oxide superconducting bulk material, then prepare a diameter 38 mm, height 12 mm oxide superconducting bulk material.

Figure 12:
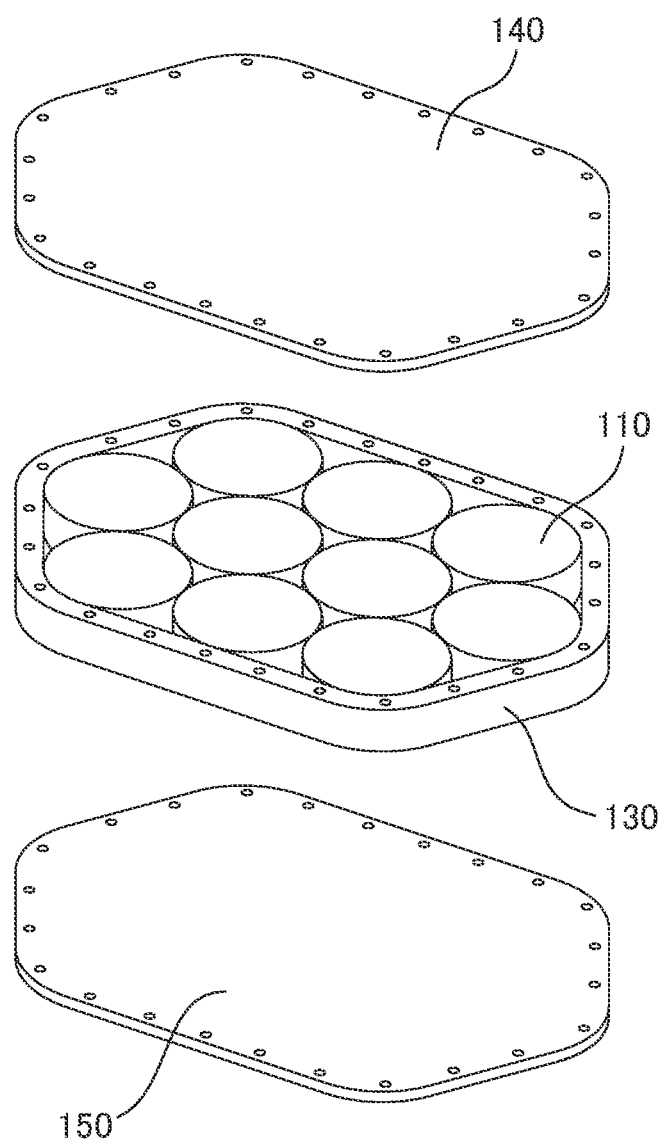
FIG. 12 is a disassembled perspective view of an embodiment showing one example of an oxide superconducting bulk magnet having an assembly of circular columnar shaped oxide superconducting bulk materials at which bulk material reinforcing members are not arranged.

Next, 10 diameter 50 mm, height 17 mm oxide superconducting bulk materials prepared by the same manner as the above-mentioned manner were used and arranged such as shown in FIG. 12. At this time, there were no bulk material reinforcing members. For the assembly side surface reinforcing member, a thickness 12 mm, height 17 mm SUS316L ring having screw holes was used. Further, as the assembly top reinforcing member, a thickness 4.5 mm SUS316L plate having screw holes was used, as the assembly bottom reinforcing member, a thickness 11.0 mm oxygen-free copper plate having screw holes was used, and these were screwed together to prepare the comparative example oxide superconducting bulk magnet (5-A).

Figure 13:
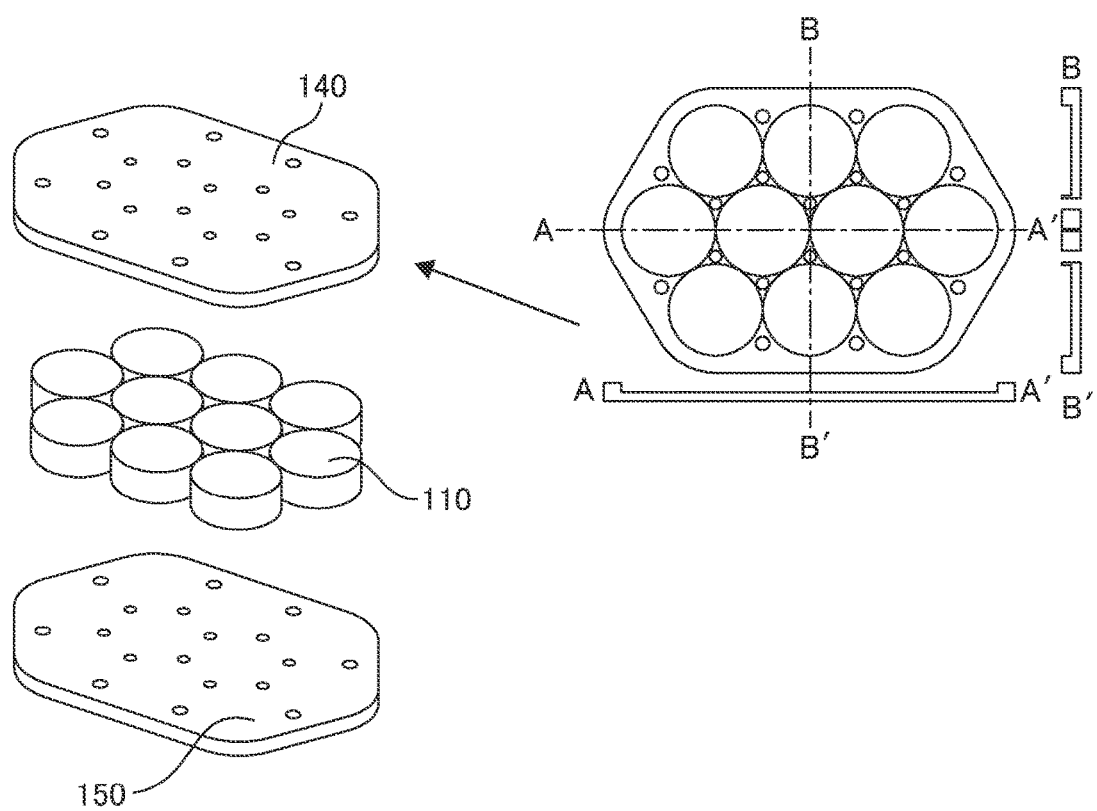
FIG. 13 is a disassembled perspective view of an embodiment showing one example of an oxide superconducting bulk magnet having an assembly of circular columnar shaped oxide superconducting bulk materials at which bulk material reinforcing members and an assembly side surface reinforcing member are not arranged.

Further, 10 diameter 50 mm, height 17 mm oxide superconducting bulk materials prepared by the same manner as the above-mentioned manner were used and arranged such as shown in FIG. 13. At this time, there were no bulk material reinforcing members. Further, there was no assembly side surface reinforcing member either.

As the assembly top reinforcing member, a thickness 7.0 mm SUS316L plate having screw holes was used.

However, the surface of the assembly top reinforcing member contacting the assembly of the oxide superconducting bulk materials, as shown in FIG. 13, was formed with a depression in which the assembly of the oxide superconducting bulk materials was fit. The thickness of this depressed part was 4.5 mm. That is, the depressed part covered part of the side surfaces of the assembly. Further, this was worked so that the positions of the screw holes corresponded to the clearances of the oxide superconducting bulk materials. FIG. 13 shows a cross-sectional view between A-A' and a cross-sectional view between B-B'. As the assembly bottom reinforcing member, a thickness 11.0 mm oxygen-free copper plate having screw holes was used. These were screwed together to prepare the comparative example oxide superconducting bulk magnet (5-B).

Figure 14:
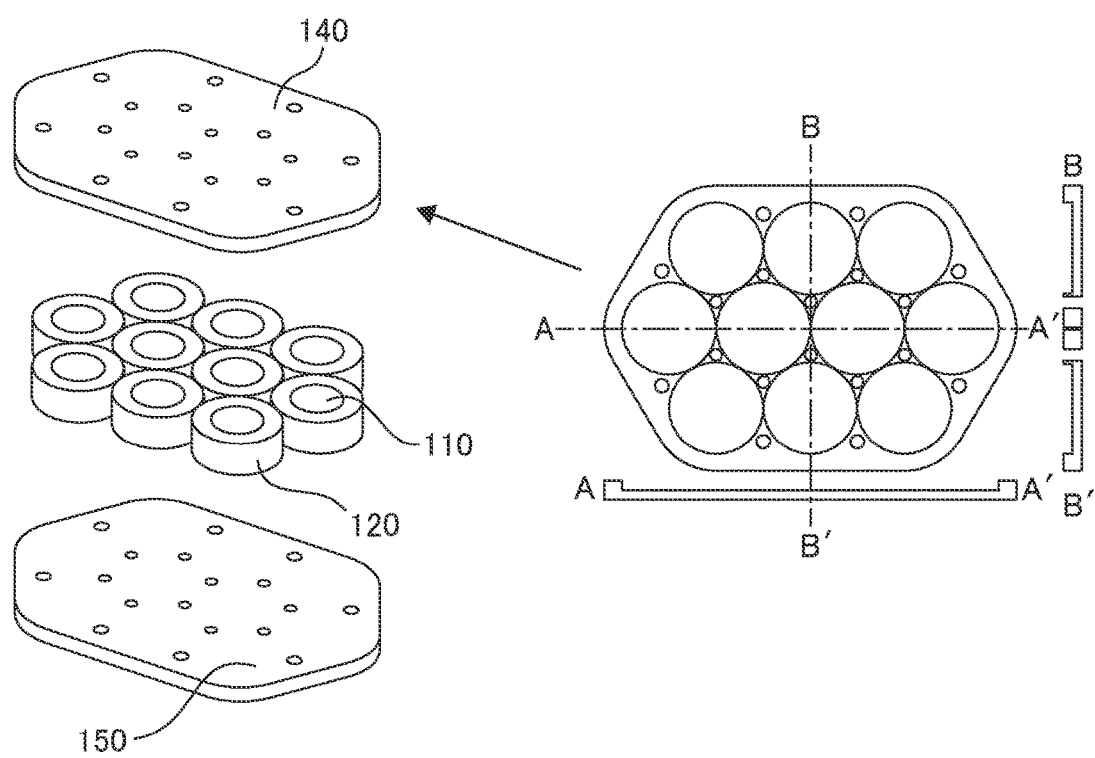
FIG. 14 is a disassembled perspective view of an embodiment showing one example of an oxide superconducting bulk magnet having an assembly of circular columnar shaped oxide superconducting bulk materials at which an assembly side surface reinforcing member is not arranged.

Further, 10 diameter 38 mm, height 12 mm oxide superconducting bulk materials were prepared by the same manner as the above-mentioned manner. Further, diameter 38 mm, height 5 mm stainless steel plates were fabricated. Therefore, as the bulk material reinforcing members, inside diameter 39.0 mm, outer diameter 50.0 mm (thickness 5.5 mm) stainless steel rings were used. As shown in FIG. 14, inside the stainless steel rings, the stainless steel plates were placed under the oxide superconducting bulk materials and these bonded with resin. In this way, 10 bulk material units were prepared. There was no assembly side surface reinforcing member. As the assembly top reinforcing member, a thickness 9.0 mm SUS316L plate having screw holes was used.

However, the surface of the assembly top reinforcing member contacting the assembly of the oxide superconducting bulk materials, as shown in FIG. 14, was formed with a depression in which the assembly of the oxide superconducting bulk materials was fit. The thickness of this depressed part was 4.5 mm. That is, the depressed part covered part of the side surfaces of the assembly. Further, the assembly was worked so that the positions of the screw holes corresponded to the clearances of the oxide superconducting bulk materials. FIG. 14 shows a cross-sectional view between A-A' and a cross-sectional view between B-B'. As the assembly bottom reinforcing member, a thickness 11.0 mm oxygen-free copper plate having screw holes was used. These were screwed together to prepare the comparative example oxide superconducting bulk magnet (5-C).

Figure 15:
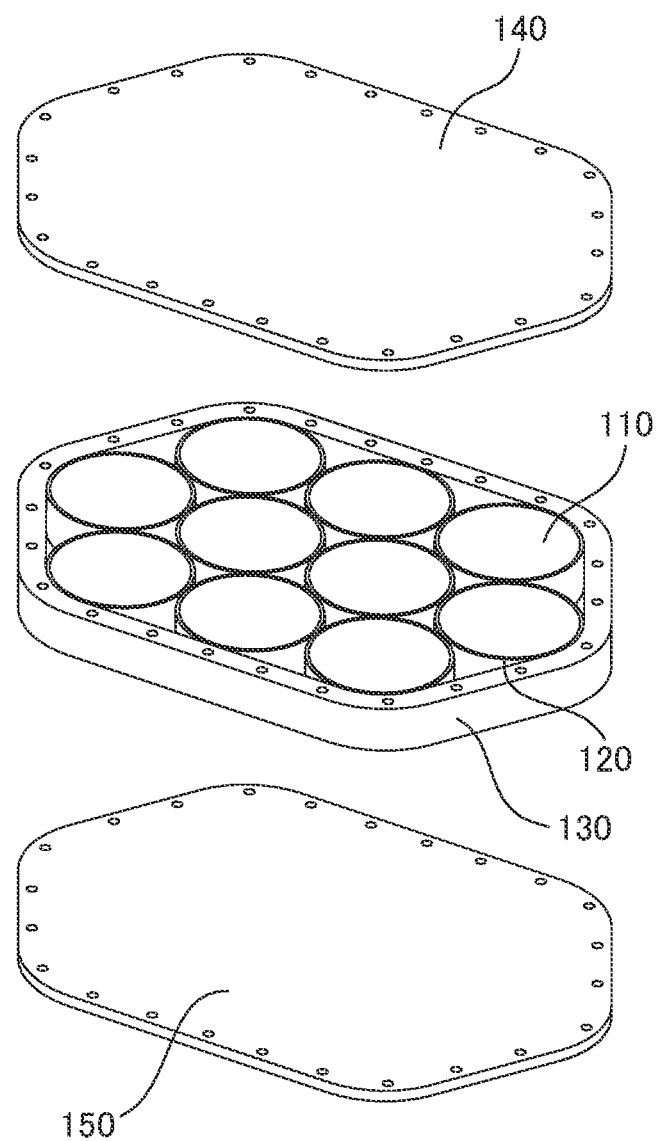
FIG. 15 is a disassembled perspective view of an embodiment showing one example of an oxide superconducting bulk magnet having an assembly of circular columnar shaped oxide superconducting bulk materials at which bulk material reinforcing members and an assembly side surface reinforcing member are arranged.

Further, 10 diameter 47 mm, height 17 mm oxide superconducting bulk materials prepared by similar methods were used and arranged such as shown in FIG. 15. At this time, for the bulk material reinforcing members, copper alloy rings of inside diameter 47.05 mm and outer diameter 50.0 mm were used and soldered. As the assembly side surface reinforcing member, a thickness 12 mm, height 17 mm SUS316L ring having screw holes was used.

Further, as the assembly top reinforcing member, a thickness 4.5 mm SUS316L plate having screw holes was used, while as the assembly bottom reinforcing member, a thickness 11.0 mm oxygen-free copper plate having screw holes was used. These were screwed together to prepare the oxide superconducting bulk magnet according to this invention (5-D).

Figure 16:
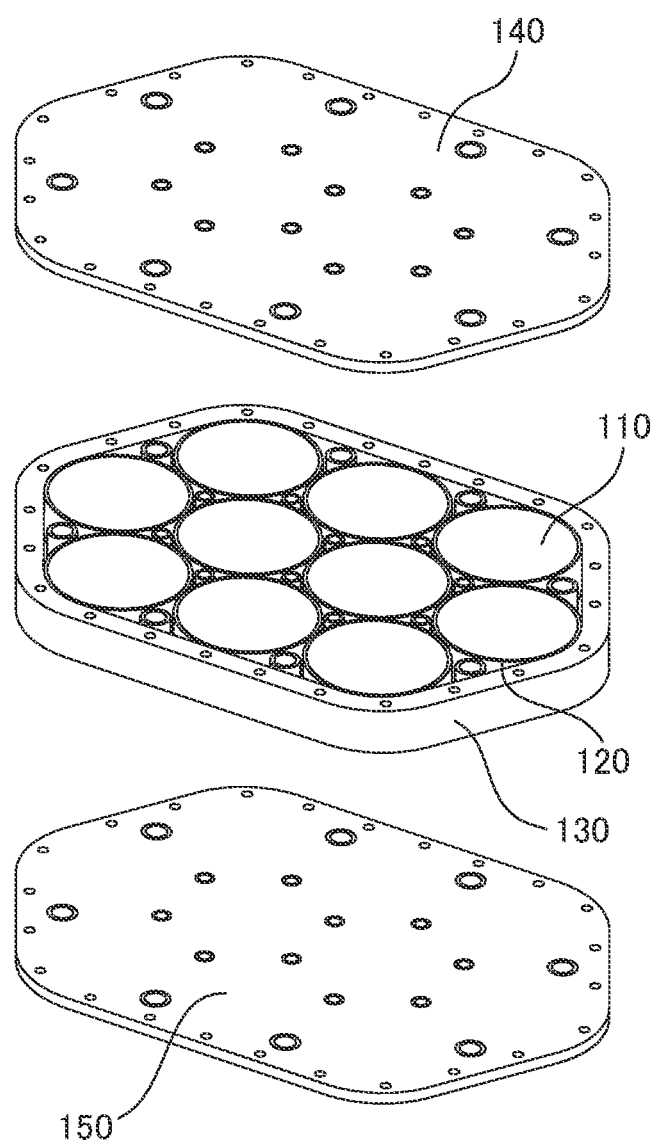
FIG. 16 is a disassembled perspective view of an embodiment showing one example of an oxide superconducting bulk magnet having an assembly of circular columnar shaped oxide superconducting bulk materials at which bulk material reinforcing members and an assembly side surface reinforcing member are arranged and in which the assembly top reinforcing member and the assembly bottom reinforcing member are joined through clearances formed inside the assembly.

Furthermore, 10 diameter 47 mm, height 17 mm oxide superconducting bulk materials prepared by the same manner as the above-mentioned manner were used and arranged as shown in FIG. 16. At this time, for the bulk material reinforcing members, copper alloy rings of inside diameter 47.05 mm and outer diameter 50.0 mm were used and soldered. For the assembly side surface reinforcing member, a thickness 12 mm, height 17 mm SUS316L ring having screw holes was used.

Further, as the assembly top reinforcing member, a thickness 4.5 mm SUS316L plate having screw holes was used, while as the assembly bottom reinforcing member, a thickness 11.0 mm oxygen-free copper plate having screw holes was used. Furthermore, when joining the assembly top reinforcing member and the assembly bottom reinforcing member through the assembly side surface reinforcing member, spacers were placed in the spaces between the circular columnar shaped oxide superconducting bulk materials with the bulk material reinforcing members and fastening members were used to join these at these positions as well to raise the strength and prepare the example oxide superconducting bulk magnet according to this invention (5-E).

Note that, in these examples (5-A, 5-B, 5-C, 5-D, and 5-E), the shapes of the outer circumferences of the assembly top reinforcing member and the assembly bottom reinforcing member were the same as the shape of the outer circumference of the assembly side surface reinforcing member of 5-A. Further, in Example 5-D and Example 5-E, in addition to screwing, the assembly top reinforcing member and the assembly bottom reinforcing member were soldered to the assembly side surface reinforcing member. Further, the oxide superconducting bulk material and the assembly side surface reinforcing member were buried in resin (product name: STYCAST 2850FT, made by Ablestik Japan) to prevent them from shifting during the magnetization test.

Next, to compare the effect of the presence of the bulk material reinforcing members and assembly side surface reinforcing member and the effect of joining the assembly top reinforcing member and the assembly bottom reinforcing member through the spacers, magnetization tests were performed on the above Comparative Example 5-A, Comparative Example 5-B, Comparative Example 5-C, Invention Example 5-D, and Invention Example 5-E.

Table 5 shows the presence of breakage in the oxide superconducting bulk materials and the number of the broken circular columnar shaped oxide superconducting bulk materials under the magnetization conditions of various external magnetic fields. Further, the results when measuring the amount of magnetic flux on one bulk material unit at the surface of the assembly top reinforcing member at the time of magnetization under conditions of 30K and 2.5T are shown indexed to Comparative Example 5-A as 100%. Further, at the time of magnetization at 30K and 1.5T, in each case, there was no breakage of the oxide superconducting bulk materials.

Under conditions of an external magnetic field of 30K and 3.0T, in Comparative Example 5-B, four oxide superconducting bulk materials broke, but in the other examples, there was no breakage. Further, under conditions of an external magnetic field of 30K and 4.0T, in Comparative Example 5-A, two oxide superconducting bulk materials broke, but in Comparative Example 5-C, Invention Example 5-D, and Invention Example 5-E, there was no breakage. Further, under conditions of an external magnetic field of 30K and 6.0T, in Example Invention 5-D, one oxide superconducting bulk material broke, but in Invention Example 5-E, there was no breakage.

With magnetization of 30K and 3.0T, in Comparative Example 5-B, breakage was already seen in four bulk materials. This was because in Comparative Example 5-B, there were no bulk material reinforcing members and because only part of the side surfaces of the assembly was covered, so at the time of screwing, the compressive force due to the screwing directly acted on the oxide superconducting bulk materials. The oxide superconducting bulk materials are made of ceramic, so while the compressive strength is larger than the tensile strength, basically the members are single-crystalline materials, so they are easily chipped and crack with respect to outer force. The cause is believed to be that the assembly top reinforcing member can only be fastened by a force of an extent whereby the oxide superconducting bulk materials will not break.

Further, in Comparative Example 5-C, the amount of magnetic flux decreased to 50% or less. Even in an oxide superconducting bulk material which broke, a 70% or so amount of magnetic flux could be maintained, so it was assumed that there was the same level of drop in the amount of magnetic flux as the damage and the result was judged overall as poor. From these test results, it was learned that it is possible to provide an oxide superconducting bulk magnet comprising a plurality of circular columnar shaped superconducting bulk materials combined together having the structure of the present invention wherein breakage of the oxide superconducting bulk materials is prevented and a stronger magnetic field can be generated.

TABLE 5

| Magnetization test no. | Magnetization conditions | Number of broken oxide superconducting members (ratio of amount of magnetic flux: %) | | | | |
| --- | --- | --- | --- | --- | --- | --- |
| | | 5-A (comp. ex.) | 5-B (comp. ex.) | 5-C (comp. ex.) | 5-D (invention example) | 5-E (invention example) |
| 1 | 30K, 1.5 T | 0 (100) | 0 (100) | 0 (43) | 0 (93) | 0 (93) |
| 2 | 30K, 3.0 T | 0 | 4 | 0 | 0 | 0 |
| 3 | 30K, 4.0 T | 2 | — | 0 | 0 | 0 |
| 4 | 30K, 6.0 T | — | — | 0 | 1 | 0 |
| Overall judgment | | Poor | Poor | Poor | Good | Very good |

Example 6

In Example 6, an oxide superconducting bulk magnet configured from hexagonal columnar shaped oxide superconducting bulk materials shown in FIG. 9 was examined. In the oxide superconducting bulk magnet of this example, Dy—Ba—Cu—O-based oxide superconducting bulk materials were used. First, commercially available powders of oxides of purity 99.9 mass % rare earth element (RE), barium (Ba), and copper (Cu) were weighed in a molar ratio of Dy:Ba:Cu=1:2:3. To this, $BaCeO_3$ 1.5 mass % was added and sufficiently mixed, then the mixture was calcined at 1183K for 5 hours in an oxygen stream, then further pulverized and kneaded, then again calcined at 1193K and pulverized to prepare Dy-based 123 phase calcined powder. Further, similar oxide materials were used and weighed in a molar ratio of Dy:Ba:Cu=2:1:1. To this, $BaCeO_3$ 1.5 mass % was added and sufficiently mixed, then the mixture was calcined at 1183K for 5 hours in an oxygen stream, then further pulverized and kneaded, then again calcined at 1198K and pulverized to prepare Dy-based 211 phase calcined powder.

These calcined powders were weighed to give a molar ratio of 123:211 of 3:1, then 10 mass % of silver oxide powder was added to prepare mixed powder. This mixed powder was shaped using an inside diameter 85 mm cylindrical shaped mold to prepare a shaped article. This shaped article was heated to render it a semimolten state, then was brought into contact with a seed crystal at 1313K, then was gradually cooled in a temperature region of 1263K to 1240K over 320 hours to grow a crystal and obtain a diameter approximately 65 mm single-crystal formed oxide superconducting bulk material. This was worked into a side 32 mm, height 20 mm hexagonal columnar shape which was then heat treated in an oxygen stream at 703K for 100 hours to prepare an oxide superconducting bulk material. Further, a similar method was used to obtain a single-crystal formed oxide superconducting bulk material of diameter about 65 mm, then prepare a oxide superconducting bulk material having side 30 mm and height 20 mm.

Figure 17:
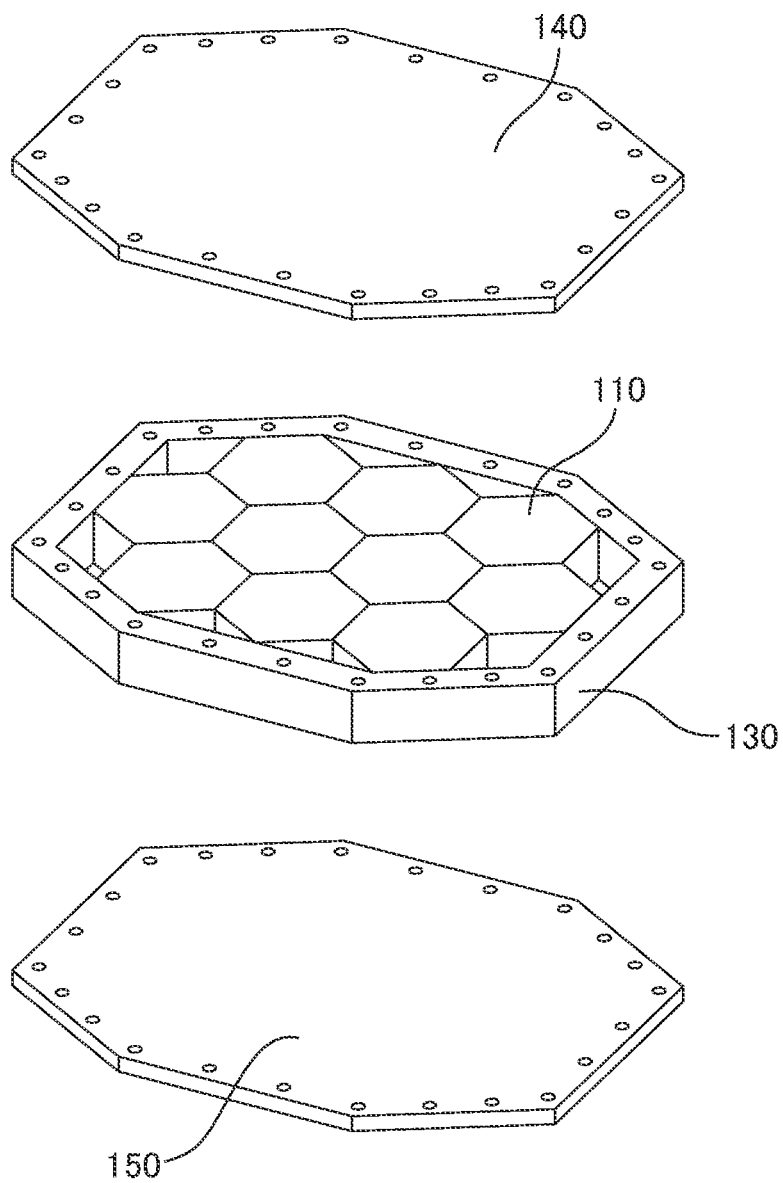
FIG. 17 is a disassembled perspective view of an embodiment showing one example of an oxide superconducting bulk magnet having an assembly of hexagonal columnar shaped oxide superconducting bulk materials at which bulk material reinforcing members are not arranged.

Next, 10 hexagonal columnar shaped oxide superconducting bulk materials of side 32 mm prepared by the same manner as the above-mentioned manner were used and arranged as shown in FIG. 17. At this time, there were no bulk material reinforcing members. For the assembly side surface reinforcing member, a thickness 14 mm, height 20 mm SUS314 ring having screw holes was used.

Further, as the assembly top reinforcing member, a thickness 5.5 mm SUS314 plate having screw holes was used, while as the assembly bottom reinforcing member, a thickness 12.0 mm oxygen-free copper plate having screw holes was used. These were screwed together to prepare the comparative example oxide superconducting bulk magnet (6-A).

Figure 18:
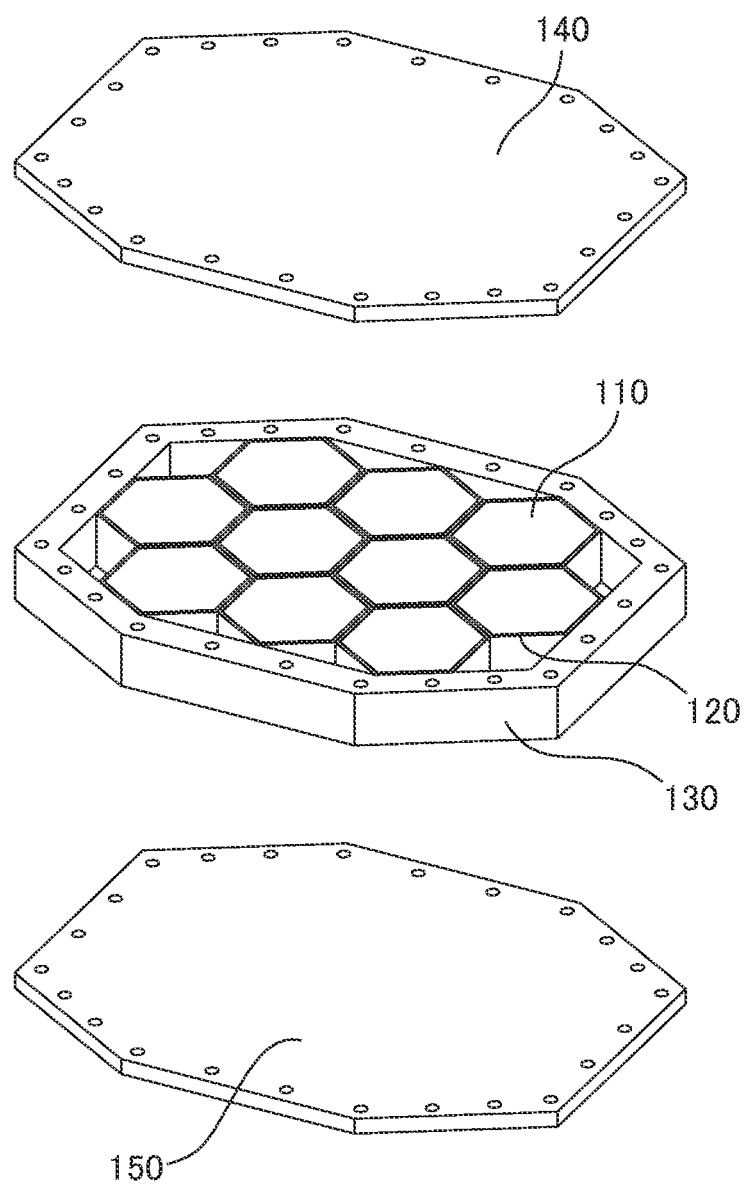
FIG. 18 is a disassembled perspective view of an embodiment showing one example of an oxide superconducting bulk magnet having an assembly of hexagonal columnar shaped oxide superconducting bulk materials at which bulk material reinforcing members and an assembly side surface reinforcing member are arranged.

Further, 10 hexagonal columnar shaped oxide superconducting bulk materials having side 30 mm and height 20 mm prepared by the same manner as the above-mentioned manner were used and arranged as shown in FIG. 18. At this time, for the bulk material reinforcing members, hexagonal columnar shape aluminum alloy rings having inside circumference side 30.05 mm and outer circumference side 32.0 mm were used and soldered. For the assembly side surface reinforcing member, a thickness 14 mm, height 20 mm SUS314 ring having screw holes was used. Further, as the assembly top reinforcing member, a thickness 5.5 mm SUS314 plate having screw holes was used, while as the assembly bottom reinforcing member, a thickness 12.0 mm oxygen-free copper plate having screw holes was used. These were screwed together to prepare the oxide superconducting bulk magnet according to this invention (6-B).

Figure 19:
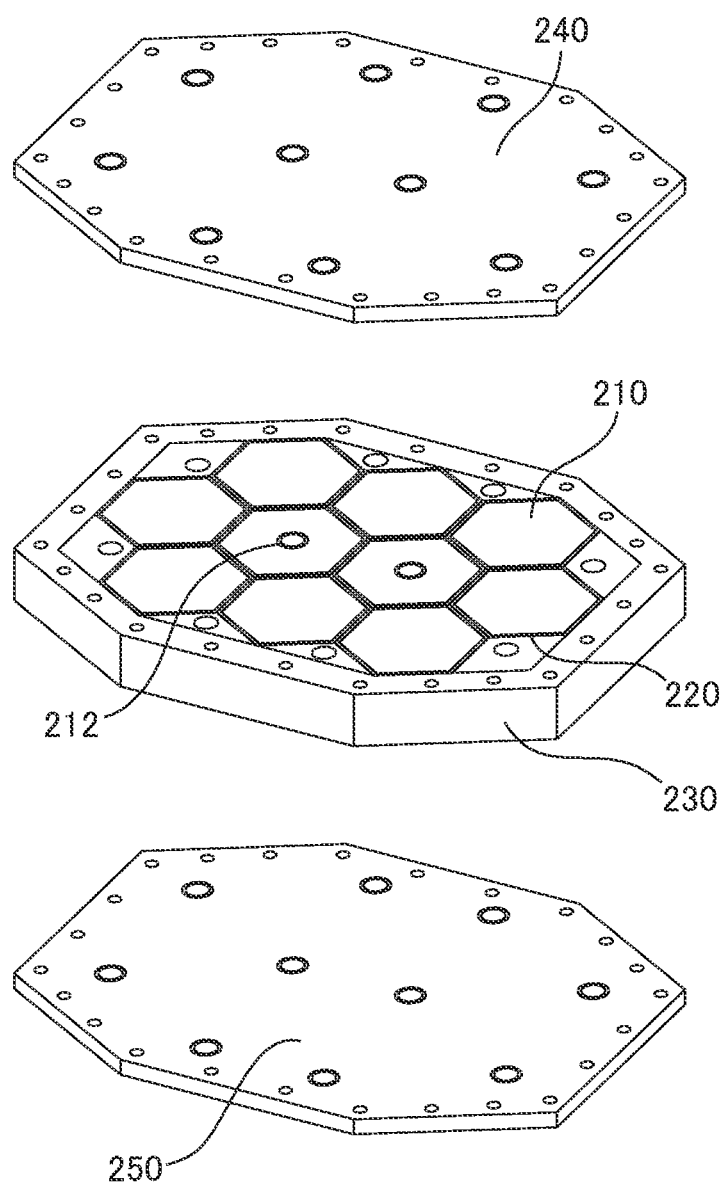
FIG. 19 is a disassembled perspective view of an embodiment showing an example of an oxide superconducting bulk magnet having an assembly of hexagonal columnar shaped oxide superconducting bulk materials at which bulk material reinforcing members and an assembly side surface reinforcing member are arranged and in which through holes are formed in the oxide superconducting bulk material and the assembly top reinforcing member and the assembly bottom reinforcing member are joined through clearances formed inside the assembly.

Still further, 10 hexagonal columnar shaped oxide superconducting bulk materials having side 30 mm and height 20 mm prepared by the same manner as the above-mentioned manner were used. Among these, the two hexagonal columnar shaped oxide superconducting bulk materials with diameter 12 mm holes formed in the center parts were used and were arranged as shown in FIG. 19. At this time, for the bulk material reinforcing members, hexagonal columnar shape aluminum alloy rings having inside circumference side 30.05 mm and outer circumference side 32.0 mm were used and soldered. For the assembly side surface reinforcing member, a SUS314 ring having thickness 14 mm and height 20 mm was used.

Further, as the assembly top reinforcing member, a thickness 5.5 mm SUS314 plate having screw holes was used, while as the assembly bottom reinforcing member, a thickness 15.0 mm oxygen-free copper plate having screw holes was used. Furthermore, when joining the assembly top reinforcing member and assembly bottom reinforcing member through an assembly side surface reinforcing member, spacers were arranged in the spaces between the hexagonal columnar shaped oxide superconducting bulk materials with bulk material reinforcing members. In addition, at the holes of the hexagonal columnar shaped oxide superconducting bulk materials formed with the holes as well, spacers were arranged. The assembly top reinforcing member and the assembly bottom reinforcing member were fastened through the spacers. At these positions as well, fastening members were used for fastening to increase the strength and prepare the example oxide superconducting bulk magnet according to this invention (6-C).

Figure 20:
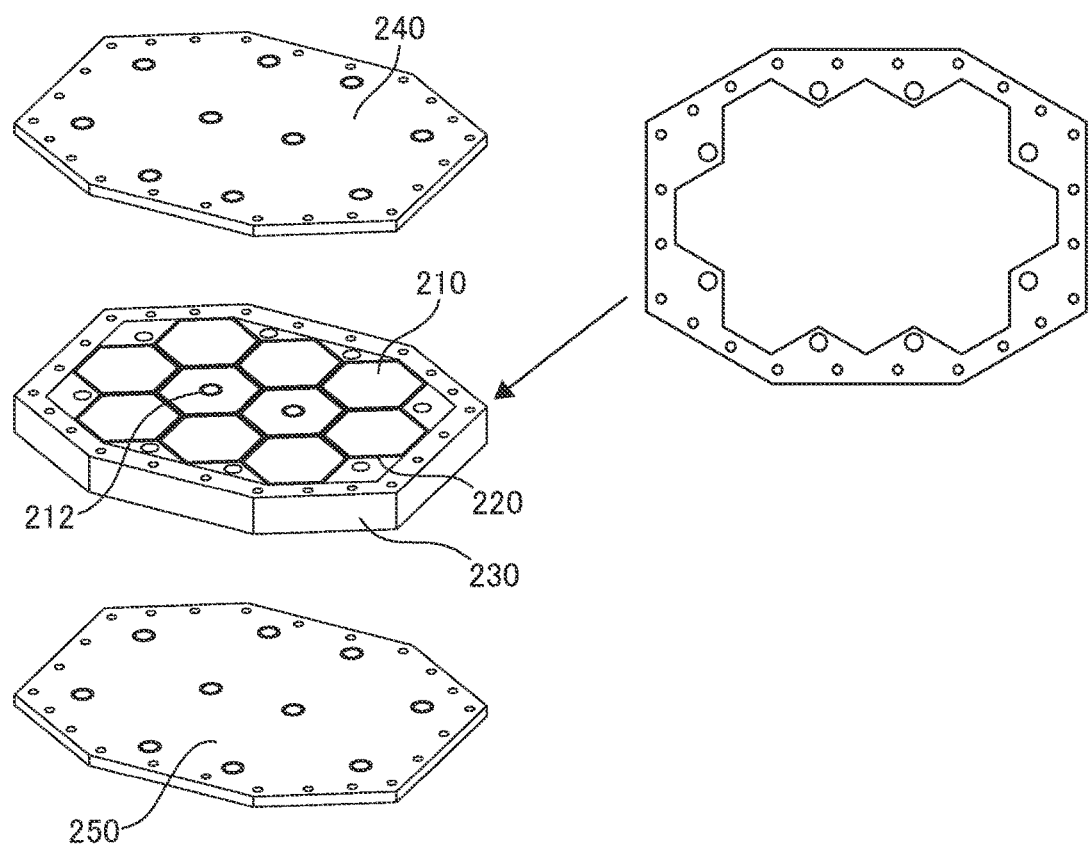
FIG. 20 is a disassembled perspective view of an embodiment showing an example of an oxide superconducting bulk magnet having an assembly of hexagonal columnar shaped oxide superconducting bulk materials at which bulk material reinforcing members and an assembly side surface reinforcing member are arranged and in which edge parts of the assembly side surface reinforcing member at the assembly side are extended so as to contact the side surfaces of the assembly.

Still further, 10 hexagonal columnar shaped oxide superconducting bulk materials having side 30 mm and height 20 mm prepared by the same manner as the above-mentioned manner were used. Among these, the two hexagonal columnar shaped oxide superconducting bulk materials with diameter 12 mm holes formed in the center parts were used and were arranged as shown in FIG. 20. At this time, for the bulk material reinforcing members, hexagonal columnar shape aluminum alloy rings having inside circumference side 30.05 mm and outer circumference side 32.0 mm were used and soldered. For the assembly side surface reinforcing member, a SUS314 ring having thickness 14 mm and height 20 mm was used.

Further, as the assembly top reinforcing member, as shown in FIG. 20, an oxygen-free copper ring having screw holes and worked to correspond to the shape of the end of the assembly (bulk material unit) of the oxide superconducting bulk materials was used. That is, the edge of the assembly side surface reinforcing member at the assembly side was extended so as to contact the side surfaces of the assembly.

As the assembly bottom reinforcing member, a thickness 15.0 mm oxygen-free copper plate having screw holes was used. Furthermore, when joining the assembly top reinforcing member and the assembly bottom reinforcing member through the assembly side surface reinforcing member, spacers were arranged in the holes of the two hexagonal columnar shaped oxide superconducting bulk materials formed with holes and the assembly top reinforcing member and assembly bottom reinforcing member were fastened through the spacers. At these positions as well, fastening members were used to join the members to increase the strength and prepare the example oxide superconducting bulk magnet according to this invention (6-D).

Note that, in these examples (6-A, 6-B, 6-C, and 6-D), the shapes of the outer circumferences of the assembly top reinforcing member and assembly bottom reinforcing member are the same as the shape of the outer circumference of the assembly side surface reinforcing member. Further, before screwing, the oxide superconducting bulk materials, bulk material reinforcing members, and assembly side surface reinforcing member were buried in a resin (product name: STYCAST 2850FT, made by Ablestik Japan) so as not to shift during the magnetization test.

Next, to compare the effect of the presence of the bulk material reinforcing members and the effect of joining the assembly top reinforcing member and the assembly bottom reinforcing member through the spacers, magnetization tests were performed on the above Comparative Example 6-A, Invention Example 6-B, Invention Example 6-C, and Invention Example 6-D.

Table 6 shows the presence of breaks in the oxide superconducting bulk materials and the number of the broken hexagonal columnar shaped oxide superconducting bulk materials under the magnetization conditions of various external magnetic fields. In Table 6, under the conditions of an external magnetic field of 40K and 4.0T, two oxide superconducting bulk materials broke in Comparative Example 6-A, but there was no breakage in Invention Example 6-B, Invention Example 6-C, and Invention Example 6-D. Further, under the conditions of an external magnetic field of 40K and 6.0T, two oxide superconducting bulk materials broke in Invention Example 6-B, but there was no breakage in Invention Example 6-C and Invention Example 6-D.

From these test results, it was learned that it is possible to provide an oxide superconducting bulk magnet comprising a plurality of hexagonal columnar shaped superconducting bulk materials combined together having the structure of the present invention in which breakage of the oxide superconducting bulk materials is prevented and a stronger magnetic field can be generated.

TABLE 6

| Magnetization test no. | Magnetization condition | Presence of breaks (number) | | | |
|---|---|---|---|---|---|
| | | 6-A (Comp. ex.) | 6-B (Inv. ex.) | 6-C (Inv. ex.) | 6-D (Inv. ex.) |
| 1 | 40K, 4.0T | 2 | 0 | 0 | 0 |
| 2 | 40K, 6.0T | — | 2 | 0 | 0 |
| General judgment | | Poor | Good | Very good | Very good |

REFERENCE SIGNS LIST 100. oxide superconducting bulk magnet
110, 210. oxide superconducting bulk material
120, 210. bulk material reinforcing member
130, 230. assembly side surface reinforcing member
132. fastening hole (through hole)
140, 240. assembly top reinforcing member
142. fastening hole (through hole)
150, 250. assembly bottom reinforcing member
152. fastening hole (through hole)
160, 260. spacer
162. space
212. through hole
300. rotary equipment
310. rotor
320. shaft

The invention claimed is:

1. An oxide superconducting bulk magnet comprising a plurality of columnar oxide superconducting bulk materials, each of the columnar oxide superconducting bulk materials having a structure of a single-crystal form $RE_1Ba_2Cu_3O_y$ (RE is one or more elements selected from Y or rare earth elements, where $6.8 \leq y \leq 7.1$) in which $RE_2BaCuO_5$ is dispersed and comprising a top surface, a bottom surface, and side surfaces, the columnar oxide superconducting bulk materials being combined together, wherein each of bulk material units comprises the oxide superconducting bulk material and a bulk material reinforcing member arranged so as to cover side surfaces of the oxide superconducting bulk material, the bulk material units being arranged so as to face the same direction and contacting each other to form an assembly, wherein side surfaces of the assembly are completely covered by an assembly side surface reinforcing member, wherein the assembly side surface reinforcing member is thicker than the bulk material reinforcing members, wherein a top surface and bottom surface of the assembly are respectively covered by an assembly top reinforcing member and an assembly bottom reinforcing member, and wherein the assembly side surface reinforcing member, the assembly top reinforcing member, and the assembly bottom reinforcing member are joined into an integral unit.

2. The oxide superconducting bulk magnet according to claim 1, wherein the assembly side surface reinforcing member, the assembly top reinforcing member and the assembly bottom reinforcing member are integrally joined by fastening means.

3. The oxide superconducting bulk magnet according to claim 2, wherein the bulk material units are arranged so as to face the same direction and contact each other and, wherein the assembly top reinforcing member and the assembly bottom reinforcing member are integrally joined through spaces formed inside the assembly.

4. The oxide superconducting bulk magnet according to claim 2, wherein the oxide superconducting bulk materials are formed with through holes passing through a top surface and a bottom surface, and, wherein the assembly top reinforcing member and the assembly bottom reinforcing member are integrally joined through said through holes.

5. The oxide superconducting bulk magnet according to claim 1, wherein the oxide superconducting bulk material has a shape in a plan view comprising a polygon.

6. The oxide superconducting bulk magnet according to claim 5, wherein the polygonal shape which the oxide superconducting bulk material has is a tetragon, hexagon, or octagon.

7. The oxide superconducting bulk magnet according to claim 1, wherein said bulk material reinforcing members have a thickness of 5.0 mm or less.

8. The oxide superconducting bulk magnet according to claim 1, wherein a material which the assembly top reinforcing member is composed of is different from a material which the assembly bottom reinforcing member is composed of, wherein a yield strength of the assembly top reinforcing member is stronger than a yield strength of the assembly bottom reinforcing member at 300K, and wherein a thermal conductivity of the assembly bottom reinforcing member is higher than a thermal conductivity of the assembly top reinforcing member.

9. The oxide superconducting bulk magnet according to claim 1, wherein the material which the assembly top reinforcing member is composed of is nonmagnetic and the yield strength of the assembly top reinforcing member at 300K is 200 MPa or more, and wherein the thermal conductivity of the material which the assembly bottom reinforcing member is composed of is 50 W/mK or more.

10. The oxide superconducting bulk magnet according to claim 1, wherein the height of the assembly side surface reinforcing member is equal to the height of the assembly or more than the height of the assembly.

11. The oxide superconducting bulk magnet according to claim 1, wherein the assembly side surface reinforcing member and at least one of the assembly top reinforcing member and the assembly bottom reinforcing member are an integral structure.

12. The oxide superconducting bulk magnet according to claim 1, wherein the oxide superconducting bulk material has a shape in a plan view comprising a polygonal shape with rounded vertices.

13. The oxide superconducting bulk magnet according to claim 1, wherein the oxide superconducting bulk material has a shape in a plan view comprising a circle.

14. The oxide superconducting bulk magnet according to claim 1, wherein the oxide superconducting bulk material has a shape seen in a plan view comprising a racetrack shape in which a pair of facing parallel straight lines and a pair of facing curves are connected together.

* * * * *